(12) United States Patent
Hayes

(10) Patent No.: US 7,554,540 B2
(45) Date of Patent: *Jun. 30, 2009

(54) SYSTEM AND METHOD OF VISIBLE SURFACE DETERMINATION IN COMPUTER GRAPHICS USING INTERVAL ANALYSIS

(75) Inventor: Nathan T. Hayes, Minneapolis, MN (US)

(73) Assignee: Sunfish Studio, LLC, Minneapolis, MN (US)

( * ) Notice: Subject to any disclaimer, the term of this patent is extended or adjusted under 35 U.S.C. 154(b) by 6 days.

This patent is subject to a terminal disclaimer.

(21) Appl. No.: 11/828,609

(22) Filed: Jul. 26, 2007

(65) Prior Publication Data

US 2008/0074421 A1      Mar. 27, 2008

Related U.S. Application Data

(63) Continuation of application No. 10/532,907, filed as application No. PCT/US03/36836 on Nov. 17, 2003, now Pat. No. 7,250,948.

(60) Provisional application No. 60/426,763, filed on Nov. 15, 2002.

(51) Int. Cl.
    *G06T 15/40* (2006.01)

(52) U.S. Cl. .............. 345/421; 345/419; 345/422; 345/423; 345/426; 345/427; 345/582; 345/589

(58) Field of Classification Search .......... 345/419, 345/421, 422, 423, 426, 427, 582, 589
See application file for complete search history.

(56) References Cited

U.S. PATENT DOCUMENTS

| 5,239,624 | A  | * | 8/1993  | Cook et al. ......... 345/611 |
| 5,579,455 | A  | * | 11/1996 | Greene et al. ....... 345/422 |
| 5,596,685 | A  | * | 1/1997  | Ashton .............. 345/421 |
| 6,219,667 | B1 | * | 4/2001  | Lu et al. ............. 707/9 |
| 6,772,136 | B2 | * | 8/2004  | Kant et al. .......... 706/50 |

* cited by examiner

*Primary Examiner*—Kimbinh T Nguyen
(74) *Attorney, Agent, or Firm*—Nawrocki, Rooney & Sivertson, P.A.

(57) ABSTRACT

A system is provided for visible surface determination in furtherance of photorealistic rendering in a computer graphics environment. The system includes a scene database and a processor, visual characteristics of objects of an image frame of a scene of the scene database are delimited as geometric primitive. The processor, for executing an interval analysis, to a user degree of certainty, accurately and deterministically ascertains a visible solution set of an area not exceeding a pixel dimension for a pixel of an array of pixels that form said image frame.

20 Claims, 19 Drawing Sheets

(a) (b)

(c)

SYSTEM AND METHOD OF VISIBLE SURFACE DETERMINATION IN COMPUTER GRAPHICS USING INTERVAL ANALYSIS

This is a continuation under 37 C.F.R §1.53(b) of U.S. patent application Ser. No. 10/532,907 filed Apr. 27, 2005 pursuant to 35 U.S.C. §111(a), and which issued as U.S. Pat. No. 7,250,948 on Jul. 31, 2007, which is a regular application filed under 35 U.S.C. §371 of international application PCT/US2003/036836 filed Nov. 17, 2003 and published Jun. 3, 2004 as WO 2004/046881 A2 which claims priority under 35 U.S.C. §119(e)(1), of provisional application Ser. No. 60/426,763, having a filing date of Nov. 15, 2002.

TECHNICAL FIELD

The present invention generally relates to computer imaging or graphics, more particularly, to the field of photorealistic image synthesis utilizing interval-based techniques for integrating digital scene information in furtherance of constructing and/or reconstructing an image of the digital scene, and/or the construction of an image based solely on mathematical formulae.

BACKGROUND OF THE INVENTION

Photorealism for computer-generated scenes, that is to say, the production of a computer-generated scene that is indistinguishable from a photograph of the actual scene, as for instance, the elimination of aliasing, remains the "holy grail" for computer graphic artisans. So much so that Jim Blinn has proclaimed: "Nobody will ever solve the antialiasing problem," emphasis original, Jim Blinn, *Jim Blinn's Corner Notation, Notation, Notation,* 2003, p. 166. In furtherance of a general appreciation and understanding of the single most important obstacle to photorealism, i.e., the antialiasing problem, an overview of heretofore known image synthesizing processing, beginning with the notion of rendering, must be had.

Rendering is the process of reconstructing a three-dimensional visual scene as a two-dimensional digital image, with the fundamental components thereof being geometry and color. A camera that takes a photograph is one example of how a two-dimensional image of the natural three-dimensional world can be rendered. The well-known grid technique for drawing real world images is another example of how to translate real world images into two-dimensional drawings. A stick is used as the reference point for the artist's viewing position, and the artist looks through a rectangular grid of twine into a scene behind the grid. The paper the artist draws on is also divided into rectangular cells. The artist carefully copies only what is seen in a given cell in the grid of twine onto the corresponding cell on the paper.

The process of rendering a digital scene inside a computer is very similar. Where the artist creates a paper drawing, the computer creates a digital image. The artist's paper is divided into rectangular cells, and a digital image is divided into small rectangles called pixels. Unlike the rectangular cells on the artist's paper, a pixel may only be shaded with a single color. A typical computer generated image used by the modern motion picture industry is formed of a rectangular array of pixels 1,920 wide and 1,080 high. Because each pixel can only be shaded a single color, the realism of a digital image is completely determined by the total number of pixels in the image and by how accurately the computer computes the color of each pixel.

To determine the color of a pixel, a computer must "look" through the rectangular area of the pixel, much like the artist looks through a rectangular cell in the grid of twine. While the artist looks through the grid into the natural world, the computer has access to a digital scene stored in memory. The computer must determine which parts of the digital scene, if any, are present in the rectangular area of a pixel. As in the natural world, objects in the foreground of the digital scene occlude objects in the background. All non-occluded parts of the digital scene that are present in the rectangular area of a pixel belong to the visible solution set of the pixel. The method of finding the visible solution set of a pixel is called visible surface determination; once visible surface determination is complete, the visible solution set can be integrated to yield a single color value that the pixel may be assigned.

Many modern rendering programs sample the rectangular area (i.e., two dimensional boundary) of a pixel with points. This method, known as point sampling, is used to compute an approximate visible solution set for a pixel. A point-sample is a ray that starts at the viewing position and shoots through a location within the pixel into the scene. The color of each point sample is computed by intersecting objects in the scene with the ray, and determining the color of the object at the point of intersection. If several points of intersection exist between the ray and the objects of or in the scene, the visible intersection point is the intersection closest to the origin of the ray. The final color of the pixel is then determined by filtering a neighborhood of point samples.

A wide variety of point-sampling techniques are known and are pervasive in modern computer graphics. A broad class of algorithms, collectively called global illumination, simulate the path of all light in a scene arriving at a pixel via the visible points of intersection. For example, additional rays can be shot from each visible point of intersection into the scene; this type of global illumination algorithm is often called ray tracing (i.e., an image synthesizing technique using geometrical optics and rays to evaluate recursive shading and visibility). The intersection points of these additional rays are integrated into a single color value, which is then assigned to the visible point sample. Another class of algorithms that compute the color of a sample without the use of additional rays is called local illumination. Popular examples of local illumination are simple ray-casting algorithms, scan-line algorithms, and the ubiquitous z-buffer algorithm. It is common to find local illumination algorithms implemented in hardware because the results require less computational effort. Local illumination, however, typically does not provide the level of quality and realism found in the global illumination algorithms.

RenderMan® is the name of a software program created and owned by Pixar Corporation that allows computers to render pseudo life-like digital images. RenderMan, a point-sampling global illumination rendering system and subject of U.S. Pat. No. 5,239,624, is the only software package to ever receive an Oscar® award from the Academy of Motion Picture Arts and Sciences. RenderMan clearly represents the current state of the art in pseudo-realistic point sampling software. On the other end of the spectrum, game consoles such as Sony PlayStation® or Microsoft X-Box® clearly do not exhibit the quality of realism found in RenderMan, but these hardware-based local illumination gaming appliances have a tremendous advantage over RenderMan in terms of speed. The realistic frames of animation produced by RenderMan take hours, even days, to compute, whereas the arcade-style graphics of gaming appliances are rendered at a rate of several frames per second.

This disparity or tradeoff between speed and realism is typical of the current state of computer graphics. The nature of this disparity is due to the point-sampling techniques used in modern rendering implementations. Because each pixel can only be assigned a single color, the "realism" of a digital image is completely determined by the total number of pixels and by how accurately a computer chooses the color of each pixel. With a point-sampling algorithm, the most common method of increasing the accuracy of the computation is to increase the number of point samples. RenderMan and ray tracing programs, for example, use lots of point samples for each pixel, and so the image appears more realistic. Hardware implementations like X-Box, on the other hand, often use only a single point sample per pixel in order to be able to render the images more quickly.

Although point sampling is used almost exclusively to render digital images, a fundamental problem of point sampling theory is the problem of aliasing, caused by using an inadequate number of point samples (i.e., an undersampled signal) to reconstruct the image. When a signal is undersampled, high-frequency components of the original signal can appear as lower frequency components in the sampled version. These high frequencies assume the alias (i.e., false identity) of the low frequencies, because after sampling these different phenomena cannot be distinguished, with visual artifacts not specified in the scene appearing in the reconstruction of the image. Such artifacts appear when the rendering method does not compute an accurate approximation to the visible solution set of a pixel.

Aliasing is commonly categorized as "spatial" or "temporal." Common spatial alias artifacts include jagged lines/chunky edges (i.e., "jaggies,"), or missing objects. In spatial aliasing the artifacts are borne of the uniform nature of the pixel grid, and are independent of resolution. A "use more pixels" strategy is not curative: no matter how closely the point samples are packed, they will, in the case of jaggies, only make them smaller, and in the case of missing objects, they will always/inevitably miss a small object or a large object far enough away. Temporal aliasing is typically manifest as jerky motion (e.g., "motion blur," namely, the blurry path left on a time-averaged image by a fast moving object: things happen too fast for accurate recordation), or as a popping (i.e., blinking) object: as a very small object moves across the screen, it will infrequently be hit by a point sample, only appearing in the synthesized image when hit. The essential aliasing problem is the representation of continuous phenomena with discrete samples (i.e., point sampling, for example, ray tracing).

Despite the fact that rigorous mathematical models directed to the cause of aliasing in point-sampling algorithms have been well established and understood for years, local and global illumination algorithms based on point sampling continue to suffer from visual artifacts due to the aliasing problem. A tremendous amount of prior art in the field of computer graphics deals explicitly with the problem of aliasing.

Increasing the number of point samples to improve realism and avoid aliasing is not a viable solution because it simply causes the aliasing to occur at higher frequencies in the image. In fact, the current literature available on computer graphics seems to indicate that point sampling techniques have reached their practical limits in terms of speed and realism. Increasingly elaborate and sophisticated probabilistic and statistical point sampling techniques are being investigated to gain marginal improvements in the realism of global illumination. Advances in point-sampling hardware are being used to improve the speed of local illumination techniques; but even with unlimited hardware speed, the best that can be hoped for is that hardware systems will some day be able to generate images of the same quality as existing global illumination algorithms which still suffer from aliasing problems caused by point sampling. While tremendous advances have been made in the realism and speed by which two-dimensional images of digital scenes are rendered, there is a continuing need to further improve the speed and realism of rendering of digital image reconstruction in furtherance of photorealistic image synthesis.

SUMMARY OF THE INVENTION

The present invention provides a system and attendant methodology for digital image reconstruction using interval analysis. This image reconstruction system, rather than refining the work of others, abandons that work. That is to say, heretofore known point sampling techniques and point arithmetic are discarded in lieu of the subject approach to reconstructing two-dimensional digital images of a three dimensional representation of a visual scene or an actual, tangible three dimensional object. Integral to the subject invention is the use of an area analysis framework instead of conventional point sampling to compute accurately and deterministically the visible solution set of a pixel and to integrate its color.

Preferred embodiments of the subject invention, more particularly the system, provide several advantages over conventional rendering techniques. Most modern ray tracing algorithms only support geometric primitives of a low degree such as planes, triangles, spheres, and quadrics because the methods commonly used to find the visible point of intersection between a point-sampling ray and the primitive are numerically unstable for higher degree functions. Moreover, because it has been heretofore impossible to compute in an accurate and deterministic manner the visible solution set of a pixel using traditional point-sampling techniques, undesirable aliasing must appear on reconstructed images using conventional point-sampling. Prior strategy has been the reduction of aliasing, not the elimination of aliasing.

In the context of the subject invention, the visible solution set of a pixel is determined through interval analysis, since traditional point-based numerical analysis cannot "solve" such computational problems to a degree of imperceptible aliasing. Unlike point sampling techniques, interval analysis guarantees accuracy to a user-specified level of detail when computing the color of a pixel. In fact, it is possible to eliminate aliasing to the extent of hardware precision or to any user-defined precision above that threshold. Taken together, these benefits facilitate a new framework of scalable rendering, where speed and realism are no longer competing forces in the rendering process, and users can easily adjust the parameters of the rendering algorithm to define a ratio of speed and realism that suits their specific needs.

Given the above advantages, preferred embodiments of the system may be used with any general form of projection. For example, by representing RGB (red-green-blue) coloration as three intervals rather than three points, a process for automatic adaptive resolution is possible, i.e., the dimension of a more and more refined rendering interval can be compared to the fidelity of the rendering machine to adaptively stop rendering smaller intervals once an optimum presentation has been obtained. The system is a massively parallel and scalable rendering engine, and therefore useful for distributing across servers in a network grid to optimally create more realistic images from a scene database, or for implementing in a graphics accelerator for improved performance. Moreover, still images or video images may be more efficiently broadcast to remote clients as the interval analysis methods operate directly on the mathematical functions that describe a scene as opposed to a piecewise geometric or tesselated model of the scene, thus providing efficient data compaction for transmission over limited bandwidth connections.

With preferred embodiments of the system, an entire scene can be loaded on each computer connected to an output device so as to synchronously display an image either by sequentially displaying data from each computer, displaying disjoint pieces from each computer, or a combination of both. The system can casually seek edges of objects or transitional areas, i.e., areas with increased levels of information to concentrate the rendering effort. Convergence to the proper visible solution set of a pixel is a deterministic operation which exhibits quadratic convergence (i.e., $O(x^2)$). This is in contrast to point-sampling methods which are probabilistic and exhibit square-root convergence (i.e., $O(x^{1/2})$).

As suggested, interval analysis methods are used to compute tight bounds on digital scene information across one or more functions or dimensions. For example, the digital scene information will typically contain dimensions of space, time, color, and opacity. In addition, other dimensions, such as temperature, mass or acceleration may also exist. According to one aspect of the present invention, interval consistency methods are used to compute tight bounds on the visible solution set of a pixel for each dimension that is specified, and according to a further aspect of the present invention, interval consistency methods are used to compute tight bounds on the visible solution set of a hemisphere subtending a surface element in the digital scene. Integrating the visible solution set over the hemisphere for each dimension that is specified yields a solution to the irradiance function, which can be used to compute global illumination effects, such as soft shadows and blurry reflections.

Additional items, advantages and features of the various aspects of the present invention will become apparent from the description of its preferred embodiments, which description should be taken in conjunction with the accompanying drawings.

DETAILED DESCRIPTION OF THE INVENTION

The present invention abandons existing point sampling techniques, and instead provides a system and attendant methodology for reconstructing two-dimensional digital images of a three dimensional digital representation of a visual scene, a process referred to as rendering, so as to photorealistically synthesize images. In furtherance of detailed invention development, a rendering framework is preliminarily outlined.

Figure 1:
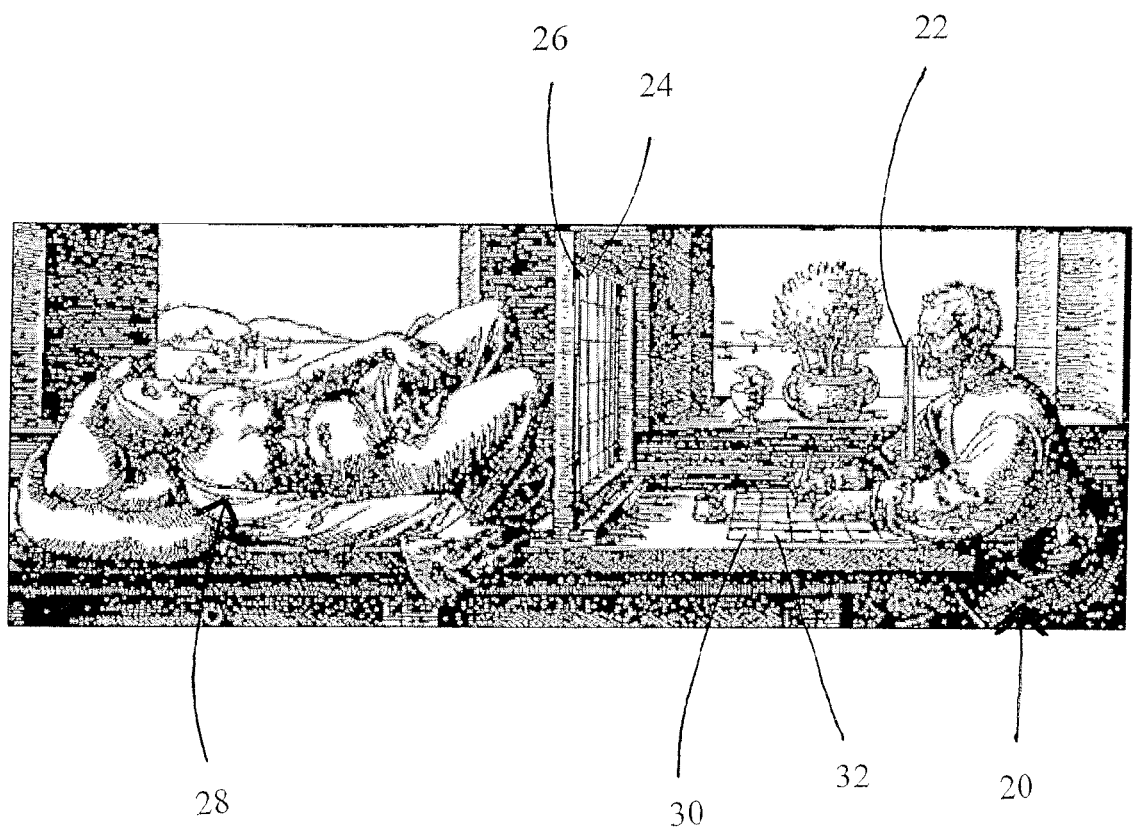
FIG. 1 is an illustration of the well-known grid technique by which an artist makes a perspective drawing of a scene.

FIG. 1 shows a classic example of how a renaissance artist uses the well-known grid technique to translate real world images into two-dimensional drawings. An artist 20 uses a stick 22 as the reference point for the artist's viewing position. The artist 20 looks through the cells 24 created by a rectangular grid of twine 26 into a scene 28 behind the grid. A drawing paper 30 on which the artist 20 will render a two-dimensional representation of the scene 28 is divided into the same number of rectangular cells 32 as there are cells 24. The artist carefully copies only what is seen in a given cell 24 in the grid of twine 26 onto the corresponding cell 32 on the paper 30.

Figure 2:
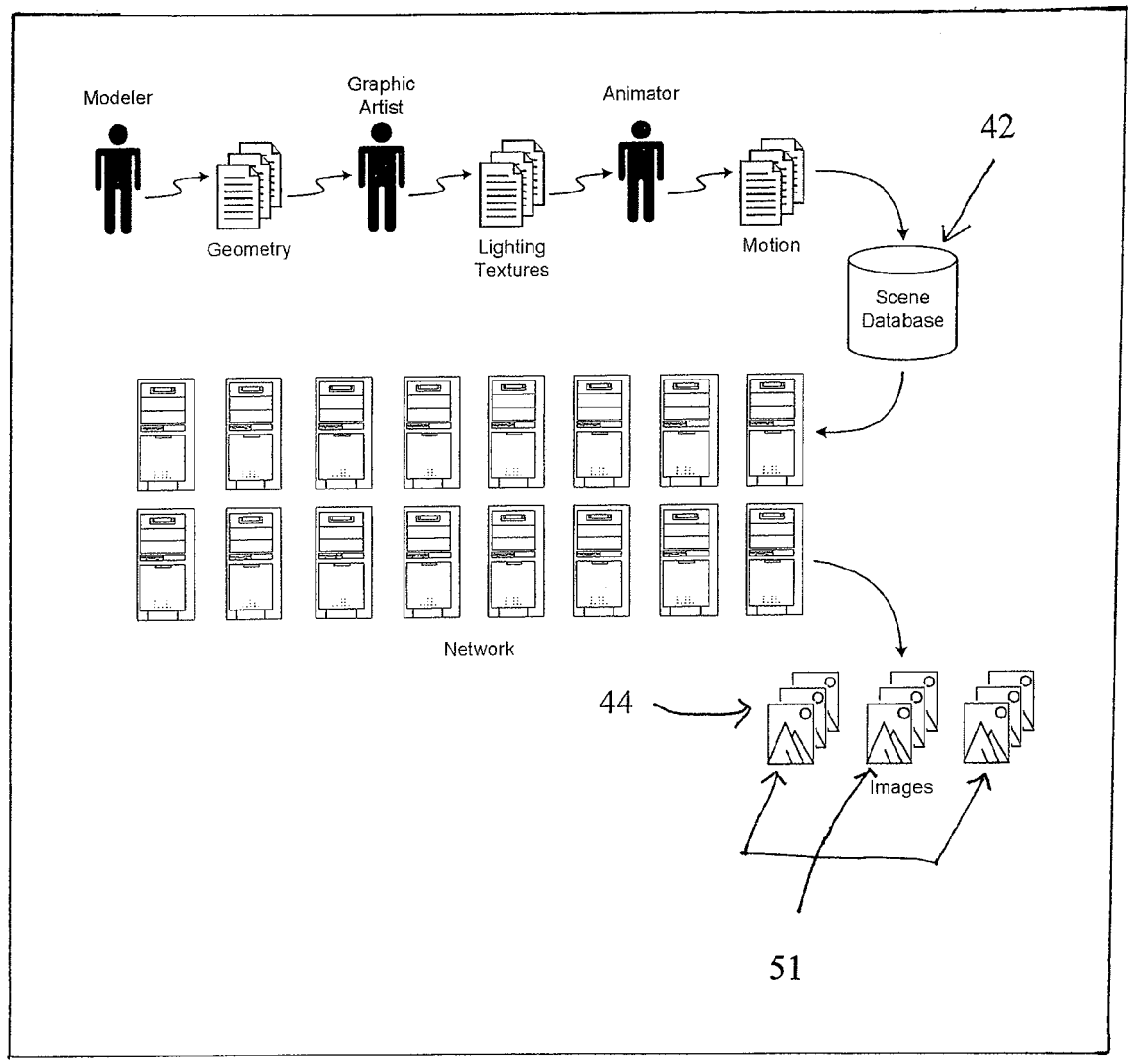
FIG. 2 is a block diagram of a typical computer graphic process of rendering a digital image.

This grid technique is the real world analogy to the computer graphic process that forms the basis of modern day digital graphics. FIG. 2 shows the overall process of how a computer graphics system 40 turns a three dimensional digital representation of a scene 42 into multiple two-dimensional digital images 44. Just as the artist uses the cells 24 and 32 (FIG. 1) to divide the representation of an entire scene into several smaller and more manageable components, the digital graphics system 40 divides an image 44 to be displayed into thousands of pixels in order to digitally display two-dimensional representations of three dimensional scenes. A typical computer generated image used by the modern motion picture industry, for example, is formed of a rectangular array of pixels 1,920 wide and 1,080 high. In a conventional digital animation process, for example, a modeler defines geometric models for each of a series of objects in a scene. A graphic artist adds light, color and texture features to geometric models of each object and an animator then defines a set of motions and dynamics defining how the objects will interact with each other including light source considerations for the scene. All of this information is then collected and related in the scene database 42. A network comprised of multiple servers then utilizes the scene database 42 to perform the calculations necessary to color in each of the pixels in each frame 44 that are sequenced together 51 to create the illusion of motion and action of the scene. Unlike the rectangular cells on the artist's paper, a pixel may only be assigned a single color.

Figure 3:
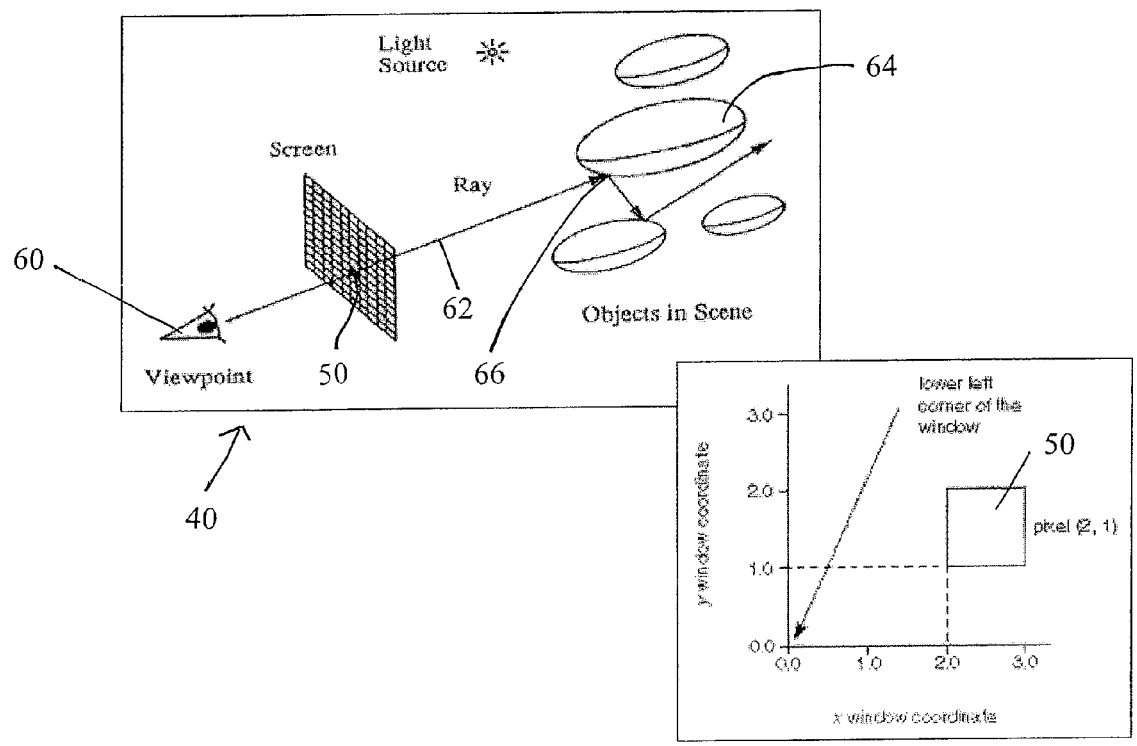
FIG. 3 is a schematic diagram of a prior art operation of a computer graphic process using an existing point-sampling process.

With reference to the prior art approach of FIG. 3, like the artist with viewpoint 60, the system 40 of FIG. 2 simulates the process of looking through a rectangular array of pixels into the scene from the artists viewpoint. Current methodology uses a ray 62 that starts at the viewing position 60 and shoots through a location within pixel 50. The intersection of the ray with the pixel is called a point sample. The color of each point sample of pixel 50 is computed by intersecting this ray 62 with objects 64 in the scene. If several points of intersection exist between a ray 62 and objects in the scene, the visible intersection point 66 is the intersection closest to the origin of the viewing position 60 of the ray 62. The color computed at the visible point of intersection 66 is assigned to the point sample. If a ray does not hit any objects in the scene, the point sample is simply assigned a default "background" color. The final color of the pixel is then determined by filtering a neighborhood of point samples.

Prior to any further development or discussion of traditional point-sampling methods, some fundamental understanding of a scene object, more particularly, its quality or character, will facilitate an appreciation of the problem at hand. The curves and/or surfaces that are used in computer graphics are all derived from various types of mathematical equations. Plug values in the variables of the equations, and they identify which points are on the object, and all the rest are not. For the most part, primitives, that is to say simple solid shapes, have a position and orientation initially set within the primitive's local coordinate system (i.e., model space), as appreciated by reference to FIG. 4 wherein there is depicted the primary notions of space, i.e., model space 66, world space 68 and camera space 70. In some modeling systems, an initial untransformed primitive is presented having unit dimensions, and is most conveniently positioned and aligned in its own local coordinate/model system. For example, a primitive sphere would have a radius of one with its center at the origin of its local/model coordinate system; the modeler would then specify a new center and radius to create the desired specific instance of a sphere in the world coordinate system (i.e., space) or the scene (i.e., camera space).

As to the surfaces of scene objects, there are three types of equations which provide the basis for computer graphic geometric primitives: explicit, implicit, and parametric. An explicit equation is one that evaluates one coordinate of the position of the object from the values of the other coordinates (e.g., z=2x+y is the explicit equation for a plane). Characteristic of the explicit equation is that it only has one result value for each set of input coordinates.

An implicit equation is one in which certain values of input coordinates satisfy an equation: S(x,y,z)=0. Points that satisfy the equation are "on" the primitive, while others that do not are "not on" the primitive. The points that are generated by complex implicit equations are not always connected, they can be isolated points or small isolated regions that satisfy the equation.

A parametric surface is a surface generated by a system of equations with two or more variables: (x,y,z)=P(u,v). For example, a sphere may be generated by the following parametric equations:

x=cos(u)cos(v)

y=sin(u)cos(v)

z=sin(v)

For the most part, the value of a parametric system is believed to be two-fold. First, because parametric equations can be evaluated directly, any point on the "object" may be computed by plugging in values for the parameters. It is easy to generate a few points that are on the surface and then, as heretofore done, approximate the rest of the surface by linear approximation or some other iterative process (i.e., tesselation). Second, because the system effectively converts a two-dimensional pair of parametric coordinates into three-dimensions, the surface has a natural two-dimensional coordinate system, thereby making it easy to map other two-dimensional data onto the surface, the most obvious example being texture maps.

Returning again now to the notion of ray tracing, in traditional point-sampling methods, a ray is defined parametrically as:

r(t)=at+b, wherein a and b are vectors and t is scalar, r(t) thereby being a vector. Points on the ray are defined for t=[0,+∞], where b is the origin of the ray and a is its direction. In the general case, surfaces in the scene are represented as the zero-set of a vector-valued implicit function:

S(x)=0

Determining the visible point of intersection between the ray and the implicit function reduces to finding the smallest positive root of the univariate equation:

S(r(t))=0

The roots of this equation can be computed algebraically for linear, quadratic and cubic functions, and this is the reason for the ubiquitous use of planes, triangles, spheres and quadrics as the geometric primitives of choice in modern ray tracing algorithms. Numerical analysis, including bisection methods or Newton's method, must be used to find the roots of functions of higher degree. Such methods are numerically unstable for functions of high degree, and there are no point analysis methods that can guarantee a solution by finding all the roots, or even the proper roots, of such functions. This is why most modern ray tracing algorithms only support geometric primitives of low degree and more complex objects are tesselated into simpler geometric primitives.

Figure 5:
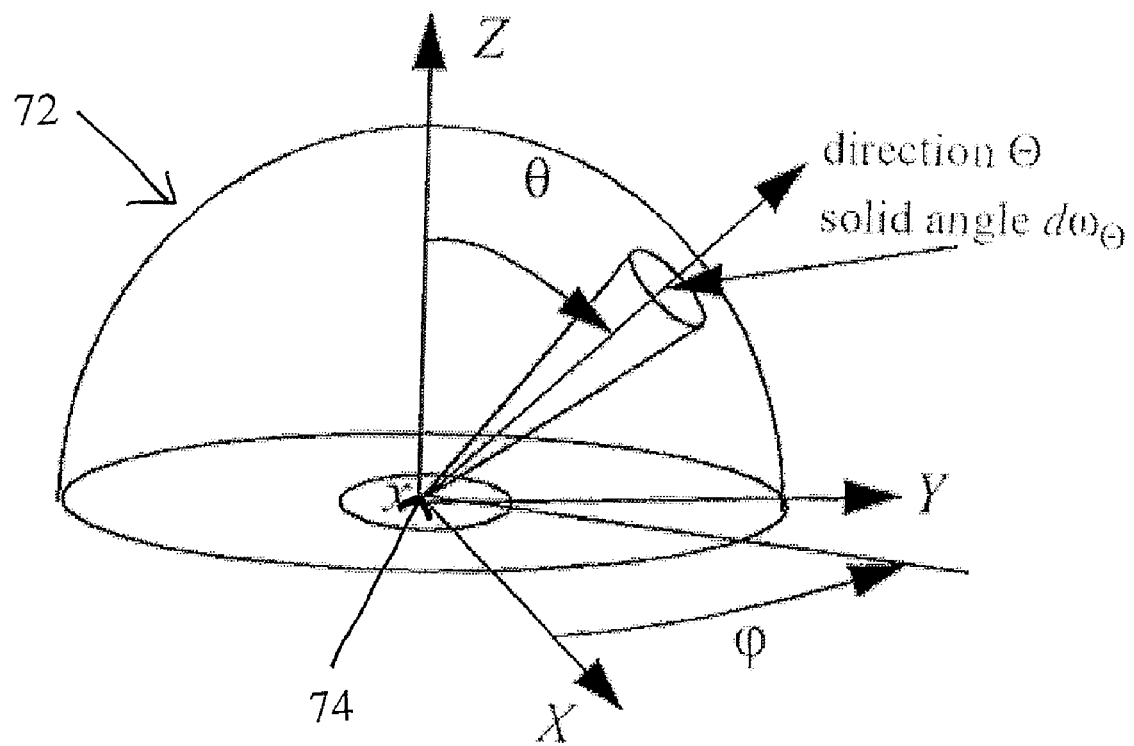
FIG. 5 is a representation of hemispherical coordinates, integral to global illumination assessment.

In photorealistic rendering, it is desirable to work with functions defined over a hemisphere 72 centered around an oriented surface point 74 (FIG. 5). A hemisphere consists of all directions in which a viewer can look when positioned at the oriented surface point: a viewer can look from the horizon all the way up to the zenith, and all around in 180°. The parameterization of a hemisphere is therefore a two-dimensional space, in which each point on the hemisphere defines a direction.

Spherical coordinates are a useful way of parameterizing the hemisphere 72. In the spherical coordinate system, each direction is characterized by two angles $\phi$ and $\theta$. The first angle, $\phi$, represents the azimuth, and is measured with regard to an arbitrary axis located in the tangent plane at x; the second angle, $\theta$, gives the elevation, measured from the normal vector $N_x$ at surface point x. A direction $\Theta$ can be expressed as the pair ($\phi$, $\theta$). The values of the angles $\phi$ and $\theta$ belong to the intervals $\phi=[0, 2\pi]$, and $\theta=[0, \pi/2]$. At this juncture, directions or points on the hemisphere have been defined. Should it be desirable to specify every three-dimensional point in space (i.e., not only points on the surface of the hemisphere), a distance r along the direction $\Theta$ is added. Any three-dimensional point is then defined by three coordinates ($\phi$, $\theta$, r).

The most commonly used unit when modeling the physics of light is radiance, which is defined as the radiant flux per unit solid angle per unit projected area. Flux measures the rate of flow through a surface. In the particular case of computer graphics, radiance measures the amount of electromagnetic energy passing through a region on the surface of a sphere and arriving at a point in space located at the center of the sphere. The region on the surface of the sphere is called the solid angle.

From a point-sampling perspective, calculating radiance is exactly equivalent to computing the entire set of visible intersection points for all rays originating at the origin of the sphere and passing through the solid angle. Since there are an infinite number of rays that subtend any given solid angle, it is clearly impossible to compute an exact value of radiance by using traditional point-sampling techniques, as it would require an infinite amount of samples. Instead, practical algorithms use only a finite number of samples to compute a discreet approximation, and this provides an opportunity for aliasing in a synthesized or reconstructed image. It is precisely the fact that point-sampling algorithms do not compute an infinite amount of samples that is the cause of aliasing in modern computer graphics.

Figure 6:
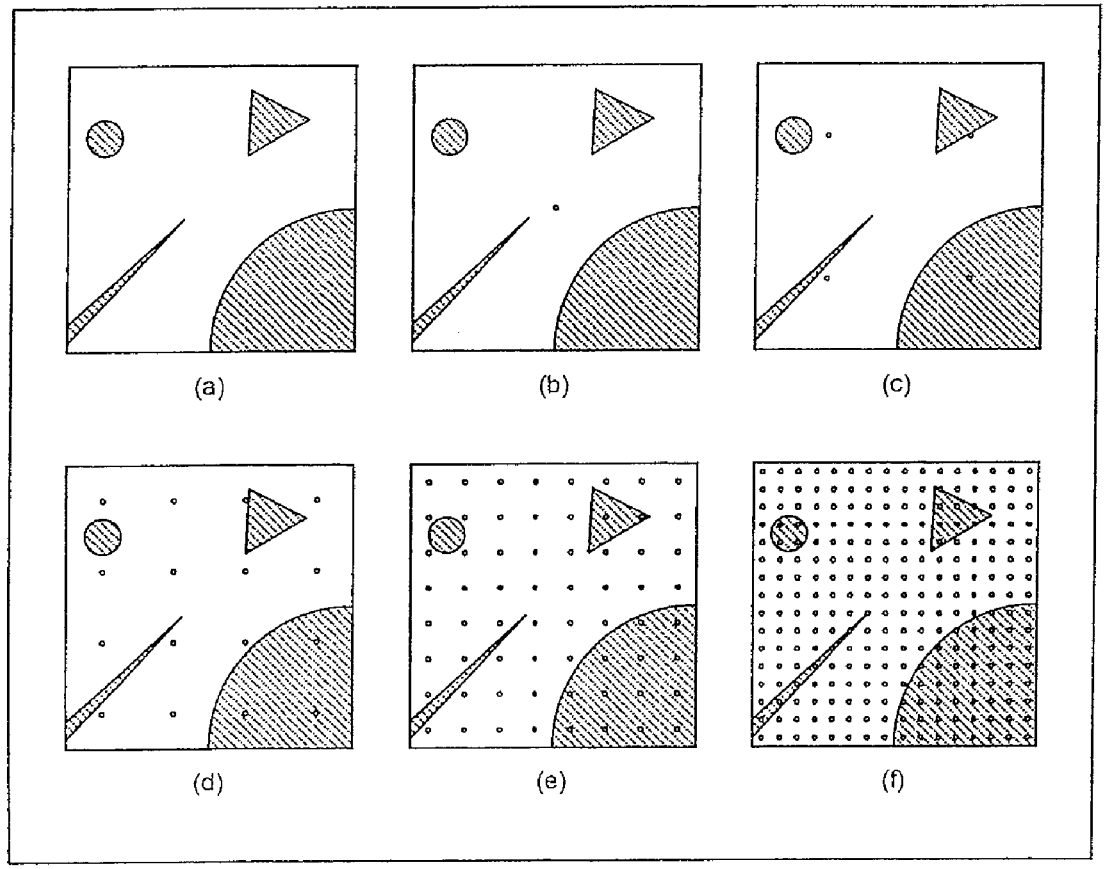
FIGS. 6(a)-6(f) are pictorial representations of the results of using the prior art point-sampling approach of FIG. 3.

Returning back again to the notion of point-sampling, and with reference now to the heretofore known approach of FIGS. 6(a)-(f), FIG. 6(a) represents a single pixel containing four scene objects, with FIGS. 6(b)-(f) generally showing a point-sampling algorithm at work in furtherance of assigning the pixel a single color. As should be readily apparent, and generally intuitive, the color of the pixel might be some kind of amalgamation (i.e., integrated value) of the colors of the scene objects. In FIG. 6(b), only a single point sample is used, and it does not intersect with any of the objects in the scene; so the value of the pixel is assigned the default background color. In FIG. 6(c), four point samples are used, but only one object in the scene is intersected; so the value of the pixel is assigned a color that is 75% background color and 25% the color of the intersected scene object. In FIGS. 6(d), 6(e) and 6(f), additional point samples are used to compute better approximations (i.e., more accurate representations) for the color of the pixel. Even with the increased number of point samples in FIG. 6(e), two of the scene objects are not intersected (i.e., spatial aliasing: missing objects), and only in FIG. 6(f) does a computed color value of the pixel actually contain color contributions from all four scene objects. In general, point sampling cannot guarantee that all scene objects contained within a pixel will be intersected, regardless of how many samples are used.

Figure 7:
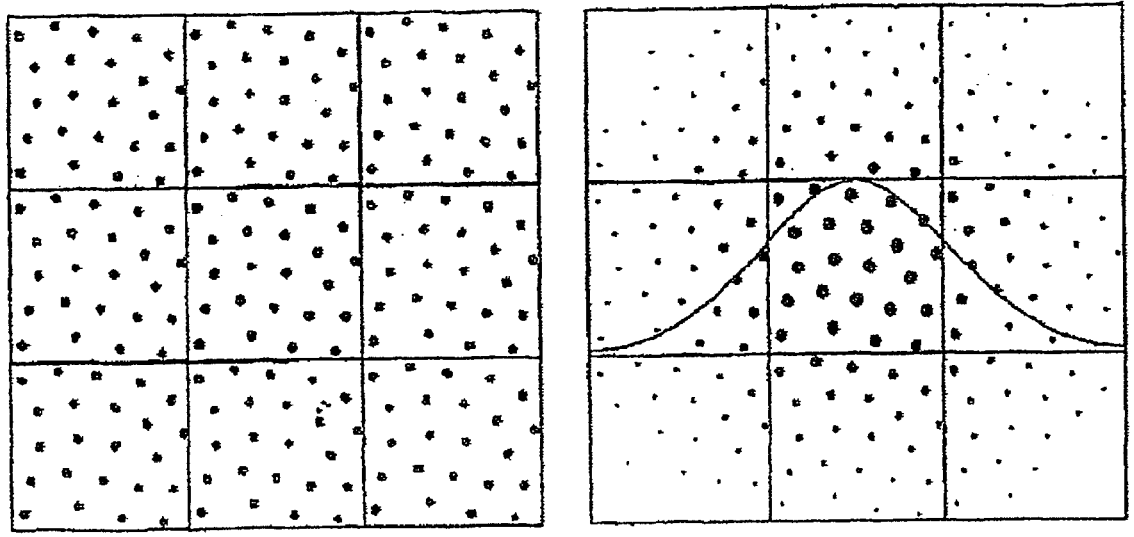
FIGS. 7(a)-(c) illustrate prior art filtering techniques for known point sampling methods.
Figure 7:
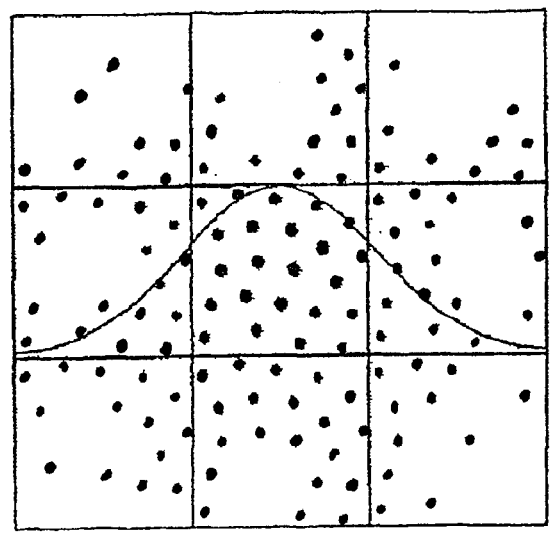

For example, in a "super sample" operation (i.e., when using lots of rays to compute the color of a pixel), each pixel is point sampled on a regular grid or matrix grid(e.g., (n)(m)). The scene is then rendered (n) (m) times, each time with a different subpixel offset. After each subpixel rendering is completed, it is summed and divided by the sum (n) (m). The subject approach need not be confined to regular (n) (m) regular grids. Known relaxation techniques can be used to automatically generate irregular super-sampling patterns for any sample count. Ultimately, the aforementioned sampling process will create partial antialiased images that are "box filtered" (FIG. 7(a)), however, there is not reason to limit samples to the area of a single pixel. By distributing point samples in the regions surrounding each pixel center, improved antialiasing, but nonetheless deficient and thereby unacceptable, results may be obtained. Geometry can be sampled using a gaussian, or other sample function, in several distinct and known ways, for instance to weight the distribution of point samples, say the (n) (m) box filtered sample of FIG. 7(a), using a gaussian distribution, and thereby achieve a weighted filtering of the (n) (m) matrix as shown in FIG. 7(b). As illustrated in FIG. 7(c), when the uniform (n) (m) matrix is abandoned in favor of a gaussian spatial distribution, and there is a homogeneity of weight with regard to the sample points, a so called importance filtering is achieved.

Figure 8:
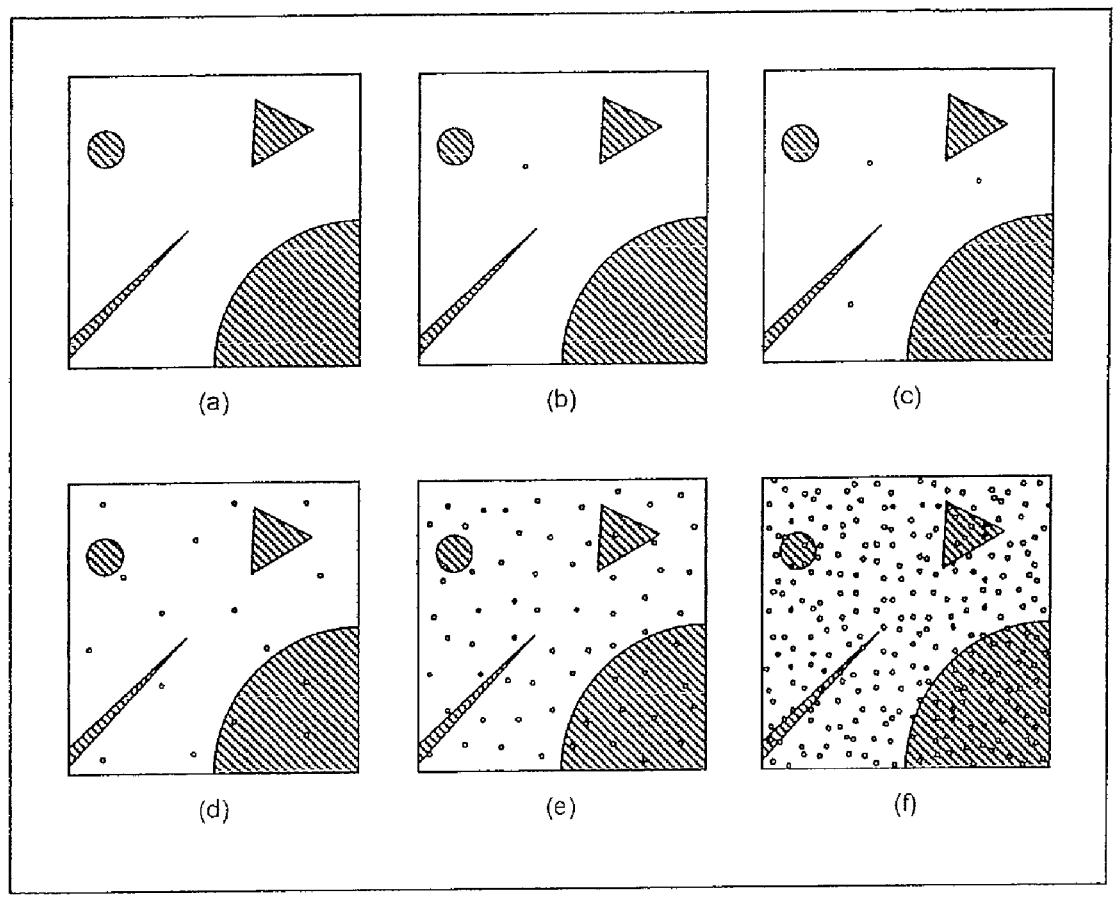
FIGS. 8(a)-8(f) are pictorial representations of the results of using a known modified stochastic point-sampling method in the prior art process of FIG. 3.
Figure 9:
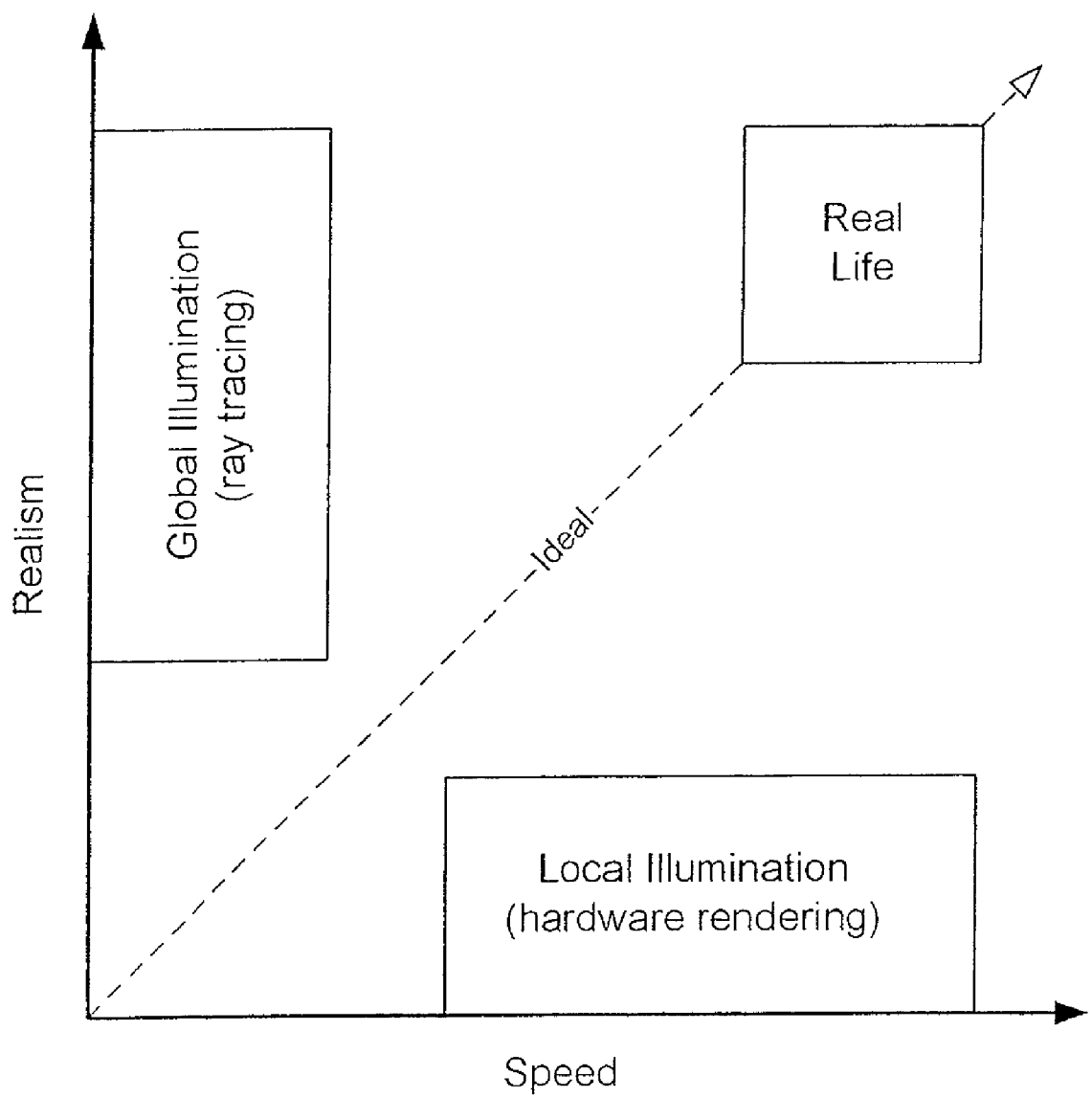
FIG. 9 is a depiction showing the tradeoff between speed of rendering and realism of an image.

Improved image synthesis has been obtained in the context of supersampling by concentrating the rays where they will do the most good (e.g., to start by using five rays per pixel, namely, one each at the pixels corners, and one through the center). However, even with such adaptive supersampling, aliasing problems nonetheless arise due to the use of regular grids (i.e., subdivisions), even though the grid is somewhat more finely, preferentially subdivided in some places. It has been found that by introducing randomness into the point-sampling process (i.e., getting rid of the grid), aliasing artifacts in a reconstructed image are disguised as "noise" which the human visual system is much less apt to perceive as objectionable (i.e., a better or improved perceptual color of the pixel is obtained with this approach, however, it is most often not any more mathematically correct). Two common algorithms that use a randomness approach are the so-called "Monte Carlo" and "stochastic point sampling" techniques. Pixar's RenderMan, for example, uses stochastic point sampling, which perturbs the position of samples within a pixel by small amounts of random displacement. Such prior approach is illustrated in FIGS. 8(a)-(f), wherein FIG. 8(a) represents the single pixel of FIG. 6(a), FIG. 9 depicting the trade-off between the speed of conventional local illumination (i.e., "fast," e.g. FIG. 6(b) or 8(b)) and the realism of global illumination (i.e., "realistic," that is to say, less "fast," e.g., FIG. 6(f) or 8(f)).

Because aliasing is impossible to completely eliminate from a point-sampled image, an area analysis framework is instead used to more accurately represent or define the problem. The mathematics involved in a global illumination model have been summarized in a high level continuous equation known as the rendering equation (i.e., a formal statement of light balancing in an environment), with most image synthesis algorithms being viewed as solutions to an equation written as an approximation of the rendering equation (i.e., a numerical method solution approach). That is to say, a solution to the rendering equation in the case of light falling on an image plane is a solution of the global illumination problem. Consistent with the model, the color of a pixel is determined by actually integrating the visible solution set over the area of an oriented surface parameterized, such as a pixel or hemisphere as previously discussed.

Historically, several attempts have been made to find exact solutions to this equation. For example, the initial ambition of Turner Whitted, who invented ray tracing in 1980, was to analytically compute an exact visible solution set between the solid angle of a cone through a pixel and the objects in the scene. He ultimately abandoned this approach due to the complexity of the intersection calculations, and this is how he instead arrived at the idea of using point sampling with rays as an approximation. In 1984, John Amanatides tried the same method. He successfully created an algorithm that approximated the visible solution set between the solid angle of a cone and simple algebraic scene objects, such as planes and spheres. Like Whitted, however, Amanatides could not solve the problem for arbitrarily complex objects or scenes. Even to this day, traditional point-based numerical analysis cannot solve, in general, such surface intersections. Instead, point sampling has become firmly entrenched as the preferred and de facto method of approximating the visible solution set. The problem formulation, and work to date, in this area, is presented by Sung, Pearce & Wang, *Spatial-Temporal Antialiasing*, 2002, incorporated herein by reference.

The present invention, in all its embodiments, abandons point arithmetic and point-sampling techniques altogether, and instead turns to an interval analysis approach. First invented and published in 1966 by Ramon Moore, interval arithmetic is a generalization of the familiar point arithmetic. After a brief period of enthusiastic response from the technical community, interval arithmetic and interval analysis (i.e., the application of interval arithmetic to problem domains) soon lost its status as a popular computing paradigm because of its tendency to produce pessimistic results. Modern advances in interval computing have resolved many of these problems, and interval researchers are continuing to make advancements, see for example Eldon Hansen and William Walster, *Global Optimization Using Interval Analysis*, Second Edition; L. Jaulin et al., *Applied Interval Analysis;* and, Miguel Sainz, *Modal Intervals*.

In one embodiment of the subject invention, the electronic computing device consists of one or more processing units connected by a common bus, a network or both. Each processing unit has access to local memory on the bus. The framebuffer, which receives information from the processing units, applies the digital image, on a separate bus, to a standard video output or, by a virtual memory apparatus, to a digital storage peripheral such as a disk or tape unit. Examples of suitable electronic computing devices include, but are not limited to, a general purpose desktop computer with one or more processors on the bus; a network of such general purpose computers; a large supercomputer or grid computing system with multiple processing units and busses; a consumer game console apparatus; an embedded circuit board with one or more processing units on one or more busses; or a silicon microchip that contains one or more sub-processing units.

The framebuffer is a logical mapping into a rectangular array of pixels which represent the visible solution set of the digital scene. Each pixel in the image will typically consist of red, green, blue, coverage and depth components, but additional components such as geometric gradient, a unique geometric primitive identifier, or parametric coordinates, may also be stored at each pixel. The image stored in the framebuffer is a digital representation of a single frame of film or video.

As previously discussed, the digital representation of a visual scene in memory is comprised of geometric primitives; geometric primitives reside in the local memory of the processing units. If there is more than one bus in the system, the geometric primitives may be distributed evenly across all banks of local memory.

Each geometric primitive is represented in memory as a system of three linear or nonlinear equations that map an n-dimensional parameter domain to the x, y and z domain of the digital image; alternatively, a geometric primitive may be represented implicitly by a zero-set function of the x, y and z domain of the digital image. John Snyder's book, *Generative Modeling for Computer Graphics and CAD; Symbolic Shape Design Using Interval Analysis,* describes a compact, general-purpose method for representing geometric primitives of both kinds in the memory of a computer. Such a method is compatible with the requirements of the present invention, and it is also the preferred method.

Because the nature of such a general-purpose method of representing geometric primitives in memory has so many possible encodings, only a single representation will be used for the sake of clarity and simplicity in the remainder of this description. The example to be used is a system of nonlinear equations that map a 3-dimensional parameter domain, specified by the parametric variables t, u, and v, to the x, y and z domain of the digital image. The resulting manifold is a parametric surface of the form $X(t, u, v) = x$ $Y(t, u, v) = y$ $Z(t, u, v) = z,$ wherein said system of equations are interval functions. To compute pixels in the framebuffer, an interval consistency method is performed on X, Y, and Z over interval values of x, y, z, t, u and v that represent the entire domain of each variable. For example, the interval domain of x, y and z will typically be the width, height, and depth, respectively, of the image in pixels, and the interval domain of t, u, and v will depend on the parameterization of the geometric primitive.

Figure 10:
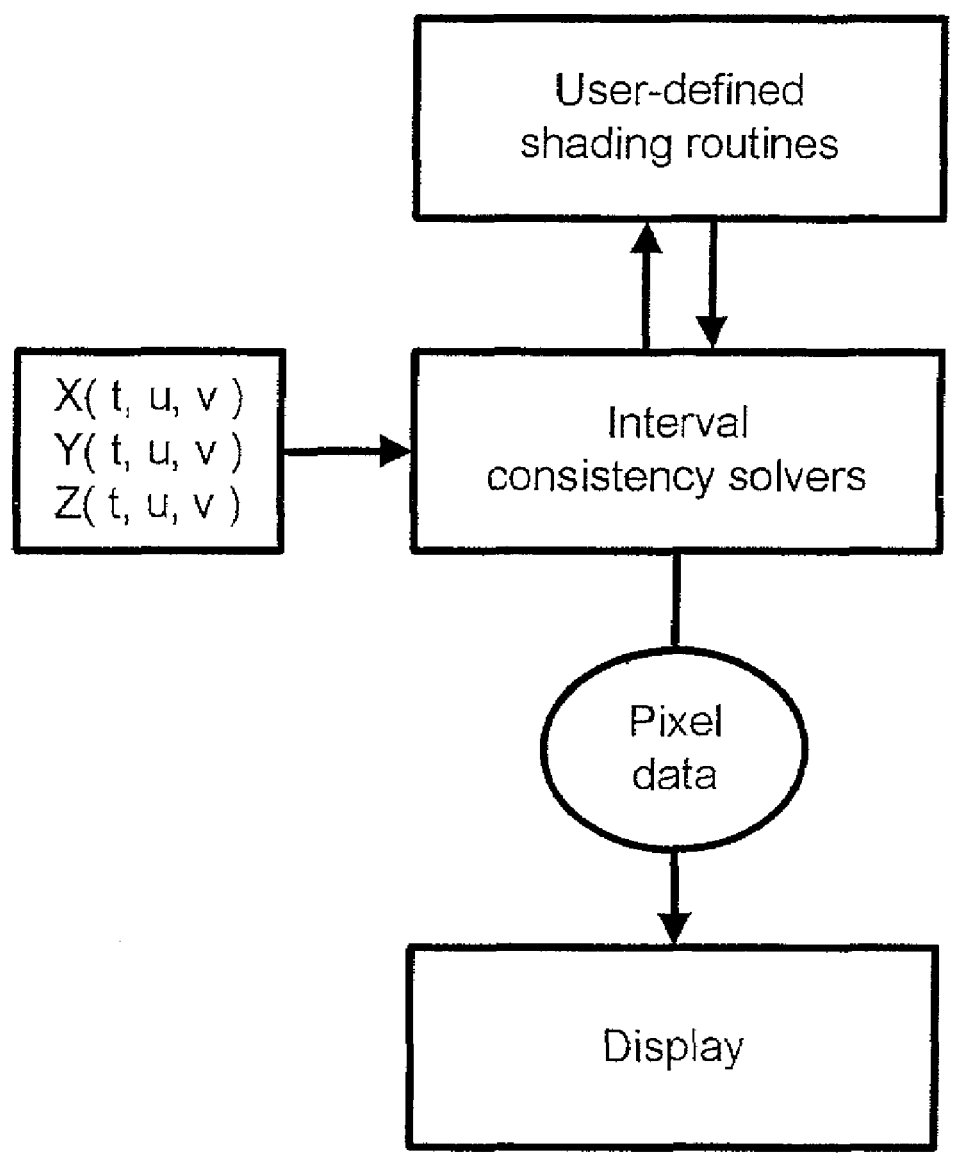
FIG. 10 is a schematic representation of the photorealistic image synthesis method of the subject invention.
Figure 11:
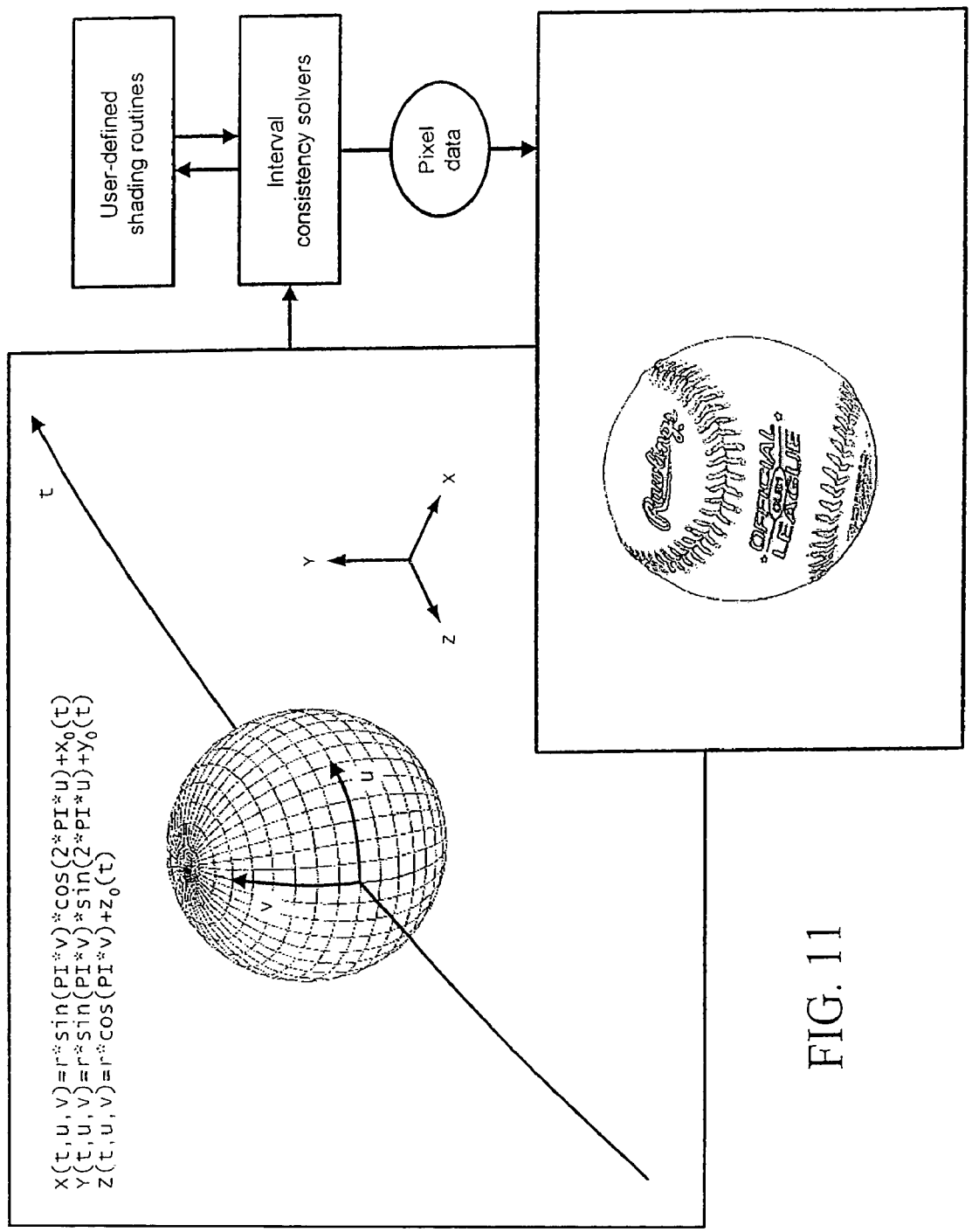
FIG. 11 is a representation as FIG. 10, wherein an exemplary system, i.e., geometric function, and corresponding display are shown.
Figure 12:
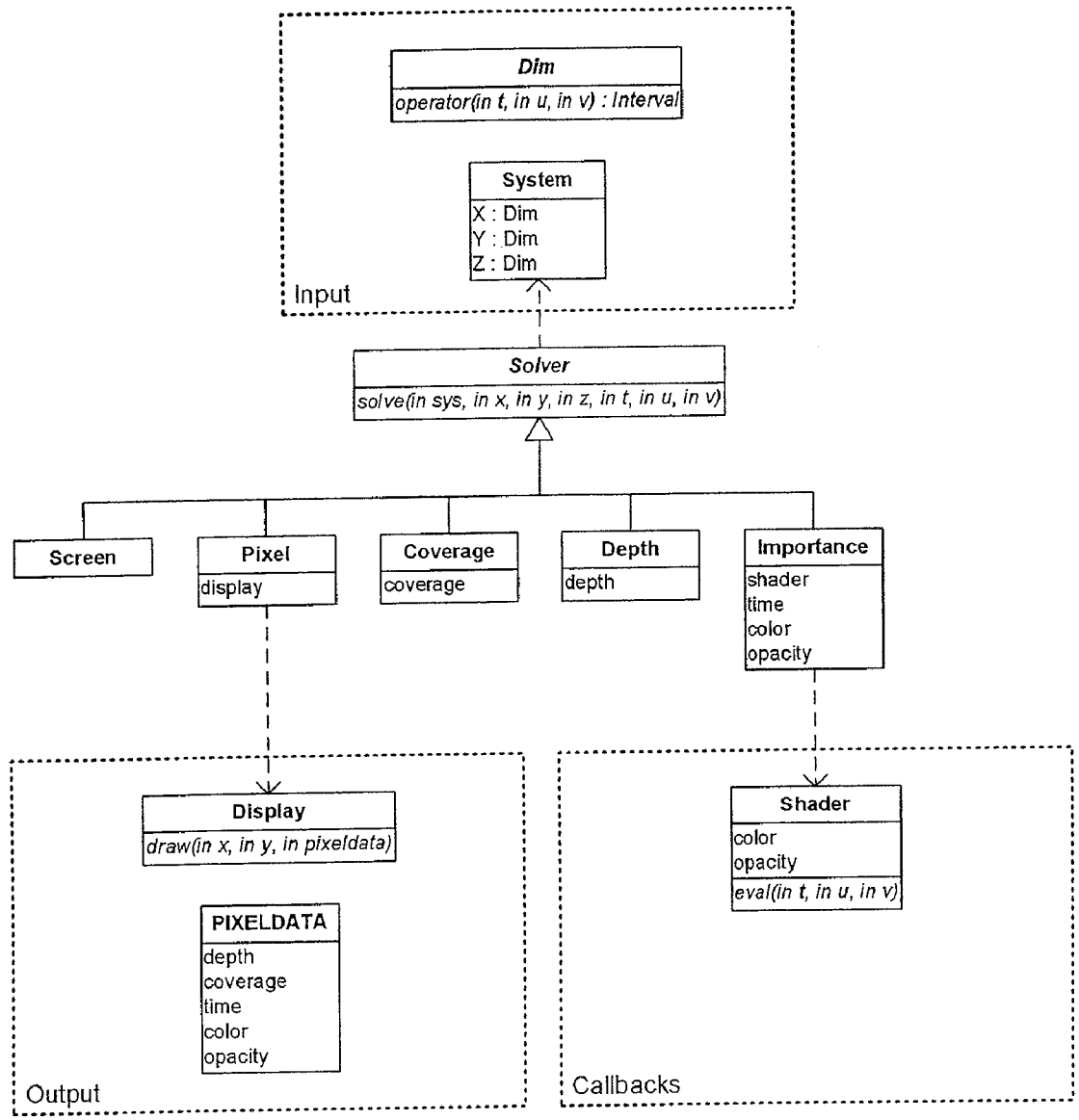
FIG. 12 is a static Unified Model Language representation of the content of FIG. 10.

Referring now to FIGS. 10-12, the subject photorealistic image synthesis process is generally shown, with particular emphasis and general specification of the methodology of the subject interval consistency approach, in furtherance of photorealistic image synthesis processing, outlined in FIG. 12, which utilizes Unified Modeling Language. As shown, central to the process are a plurality of interval consistency solvers. Operatively and essentially linked to the interval consistency solvers is a system input, exemplified in FIG. 10 by a series of generic parametric equations, each function having two or more variables, for example the t, u, and v as shown, and as representatively illustrated in FIG. 11, wherein the "system" is a sphere, the x-y-z functions being parameterized in t, u, v. It is to be understood that the system need not be limited to parametric expressions, which have the greatest utility and are most challenging/problematic, other geometric primitives, or alternate system expressions are similarly contemplated and amenable to the subject methodology and process as is to be gleaned from the discussion to this point. For example, the system can similarly render strictly mathematical formulae selectively input by a user, such as those describing polygons, and bezier surfaces, the later being the singular focus of RenderMan.

As shown, the interval consistency solvers are further reliant upon user-defined shading routines as are well known to those of skill in the art (FIGS. 10-11). The dependency is mutual, the interval consistency solvers exporting information for use or work by the shader, a valuation or assessment by the user-defined shading routines returned (i.e., imported) to the interval consistency solvers for consideration and/or management in the framework of the process.

An output of the interval consistency solvers is indicated as pixel data (i.e., the task of the interval consistency solvers is to quantitatively assign a quality or character to a pixel). The pixel data output is ultimately used in image synthesis or reconstruction, vis-a-vis forwarding the quantitatively assigned pixel quality or character to a display in furtherance of defining (i.e., forming) a 2-D array of pixels. For the parameterized system input of FIG. 11, a 2-D array of pixels, associated with a defined set of intervals, is illustrated.

With particular reference now to FIG. 12, the relationship and interrelationships between the SOLVER, INPUT, CALLBACKS, and OUTPUT is defined, and will be generally outlined, and further, the relationship between and among the several solvers, e.g., SCREEN, PIXEL, COVERAGE, DEPTH and IMPORTANCE, are defined in the figures subordinate thereto, namely FIGS. 13-18, and will be subsequently outlined.

Figure 13:
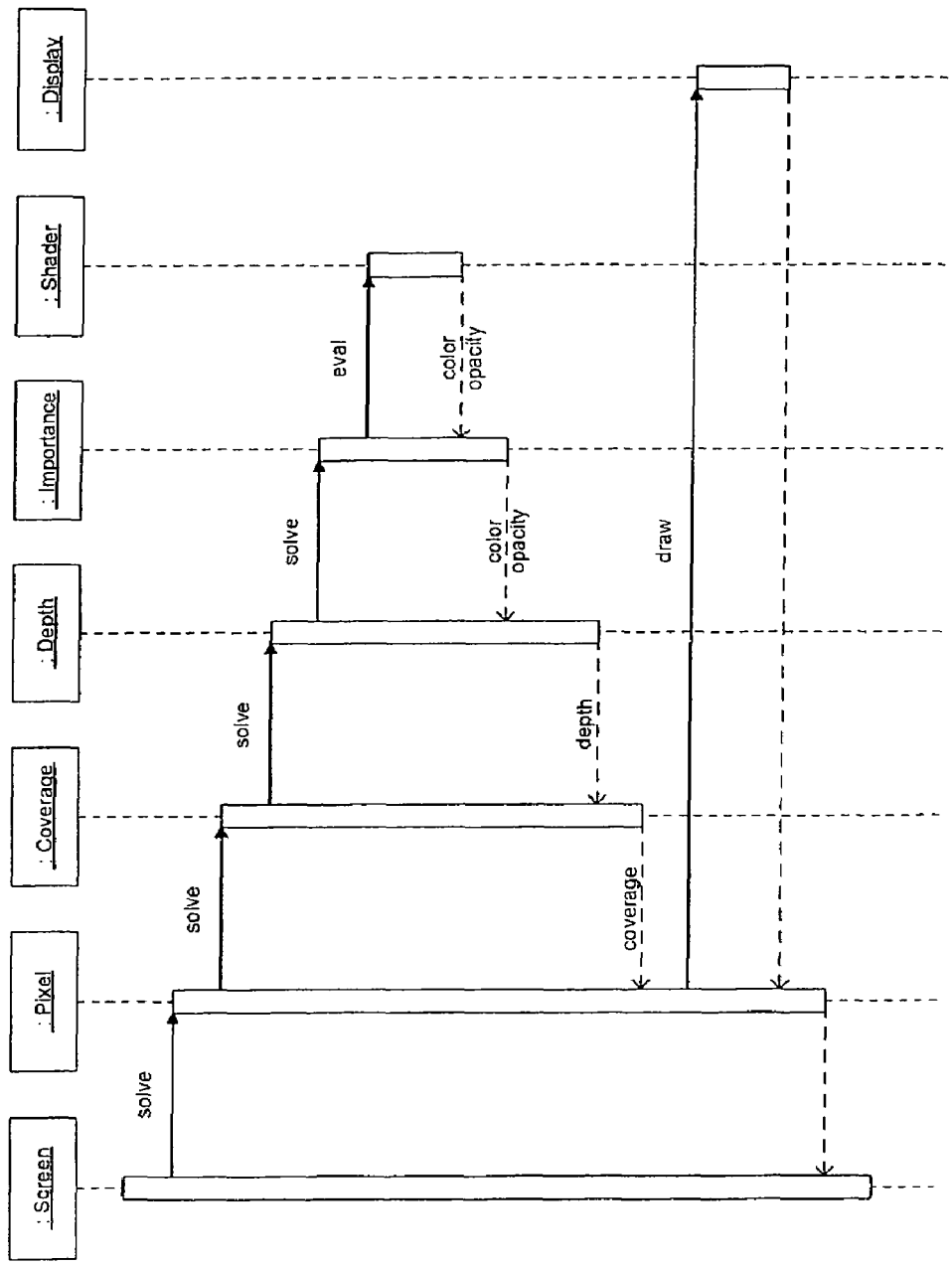
FIG. 13 is a temporal Unified Model Language representation of the solvers of FIG. 12.

The solver, more particularly the most preferred components thereof, namely SCREEN, PIXEL, COVERAGE, DEPTH, and IMPORTANCE, are shown in relation to the input (i.e., DIM and SYSTEM, that is to say, a geometric function), callbacks (i.e., shader), and output (i.e., pixel data and display). The interrelationships between the individual most preferred elements of constituents of the solver, and the general temporal hierarchy between and among each, as well as their relationships between the callbacks (i.e., the shader) and the output (i.e., the display) are schematically shown in FIG. 13. As will be subsequently discussed in the flow schematics for each of the solvers, and as is appreciated by a reference to the subject figure, hierarchical, iterative sieving progresses, in nested fashion, from the screen solver to the importance solver, with each solver exporting a constraint for which the subsequent solver is to act in consideration thereof. Values from successively embedded solvers are returned as shown, the pixel solver ultimately bundling qualities or character of color, opacity, depth, and coverage, for instance, and "issues" such bundled information package (i.e., a pixel reflecting that scene object subtending same) to the display as shown in furtherance of synthesizing the 2-D array corresponding to the image plane.

Figure 4:
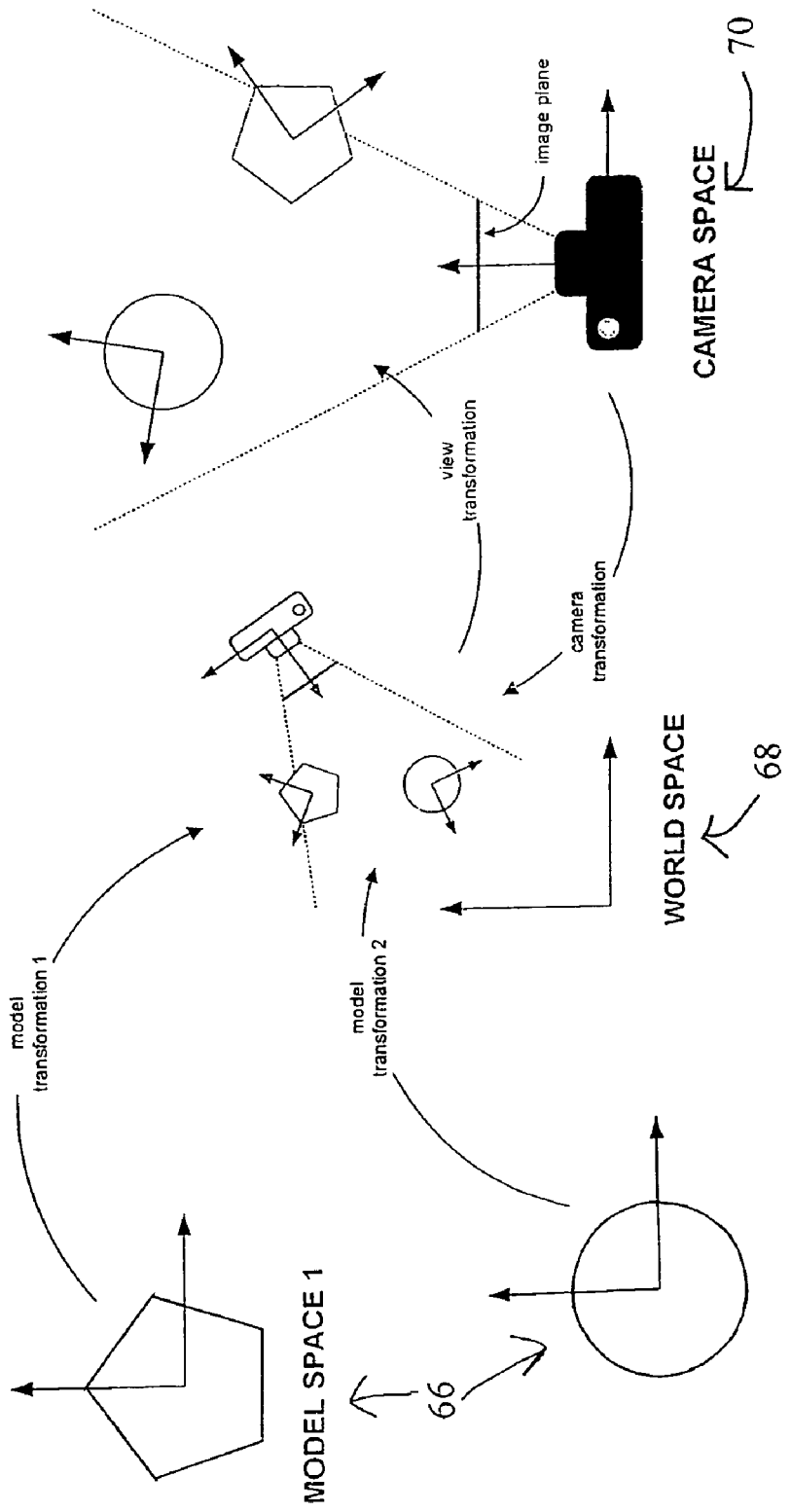
FIG. 4 represents a variety of spatial notions fundamental to image synthesis.

The screen solver effectively conducts an analysis of the screen (e.g., FIG. 3) or "image plane" of the camera space of FIG. 4, essentially performing a set inversion in x, y. The objective or job of the screen solver is a preliminary one, namely, to chop the x-y screen into x-y subunits, effectively "stopping" upon achieving (i.e., identifying) a unit (i.e., area) commensurate or corresponding to a pixel (see e.g., FIGS. 19(b)-19(f) wherein the chopping is illustrated here of a pixel, not the image plane as is a preliminary step or prerequisite to chopping the pixel area). Most preferably, SCREEN is a point from which parallel processing is pursued, further desirable for such purposes is PIXEL, as will become readily apparent as the discussion progresses.

Figure 14:
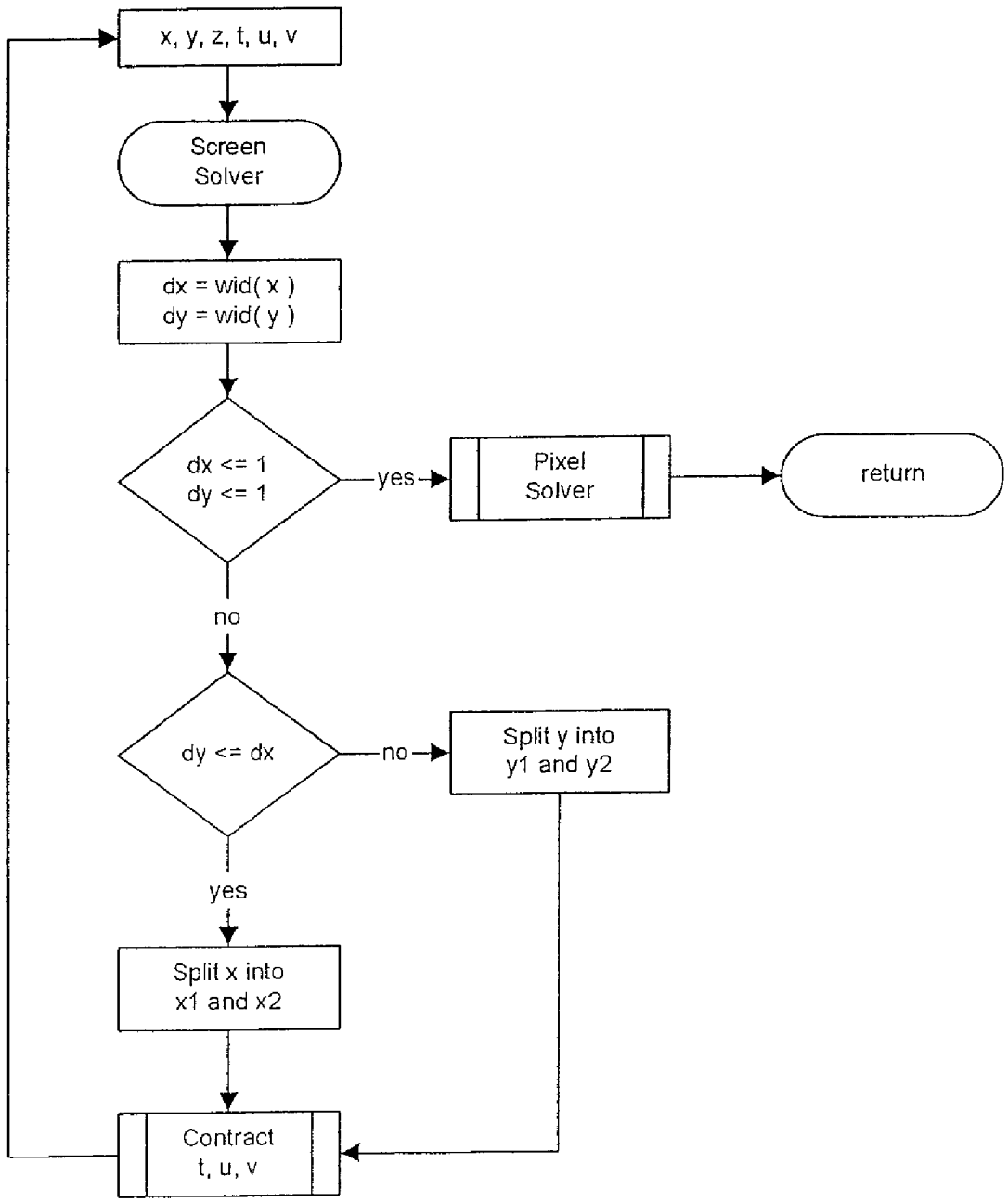
FIGS. 14-18 are schematic depictions of the work flow of the solvers of FIG. 13, namely, SCREEN, PIXEL, COVERAGE, DEPTH, and IMPORTANCE; and, FIGS. 19(a)-19(f) are pictorial representations of the operation of an interval set inversion technique for rendering in accordance with the present invention.
Figure 19:
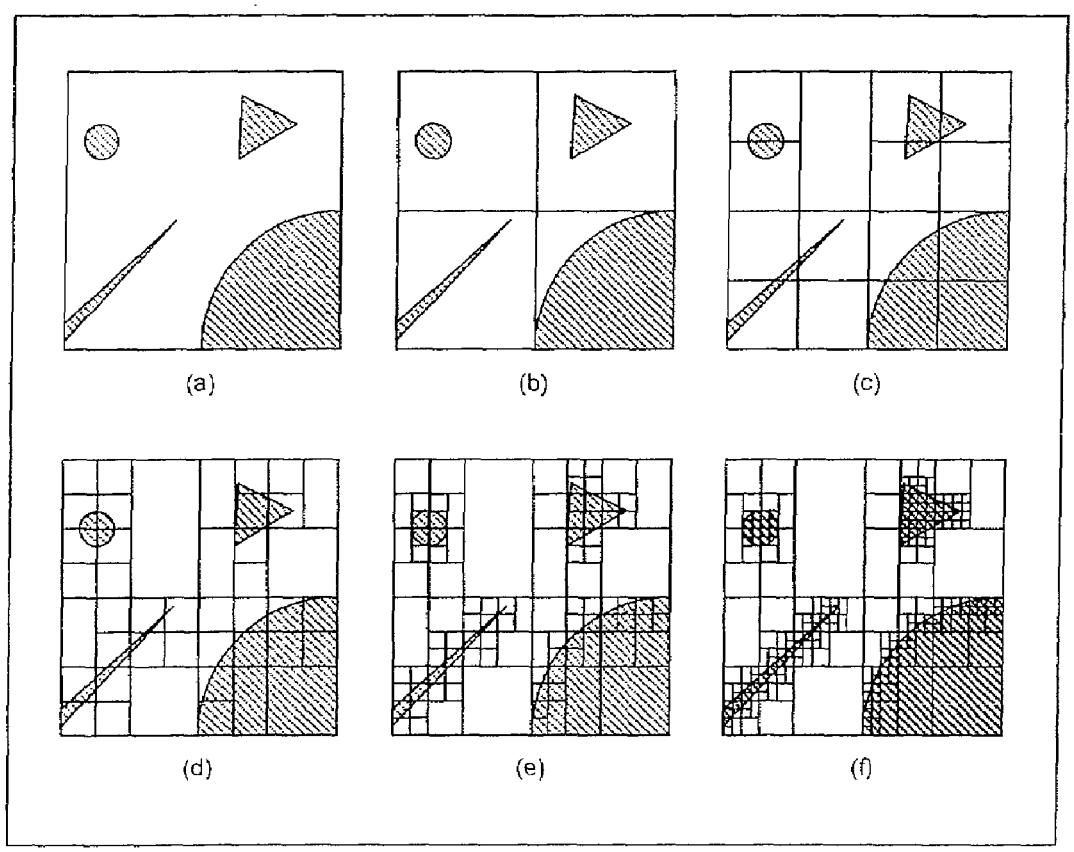

Referring now to FIG. 14, chopping of the x-y image plane begins with an initial step analogous to that illustrated in FIG. 19(b). The idea is to parse the x-y image plane to dimensional equate to a pixel. As shown, in the event that initial chopping yields a sub divided x-y area more extensive than a pixel, more chopping is conducted, namely a preferential chopping. More particularly, the nature of the x-y image plane subunit (i.e., a rectangle) is assessed and characterized as being either "landscape" or "portrait". In the event the subunit is landscape, the x dimension is further split: in the event that the subunit is portrait, then the y dimension is then split. For each iterative step in x or y (see FIG. 19(b) et seq.), the arguments t, u, and v, are contracted so as to eliminate values thereof outside the specific or "working" x-y interval (i.e., with each iteration in x and y, it is advantageous to eliminate the t, u, and v values that are not contributing, and thereby potentially contribute to aliasing).

Figure 15:
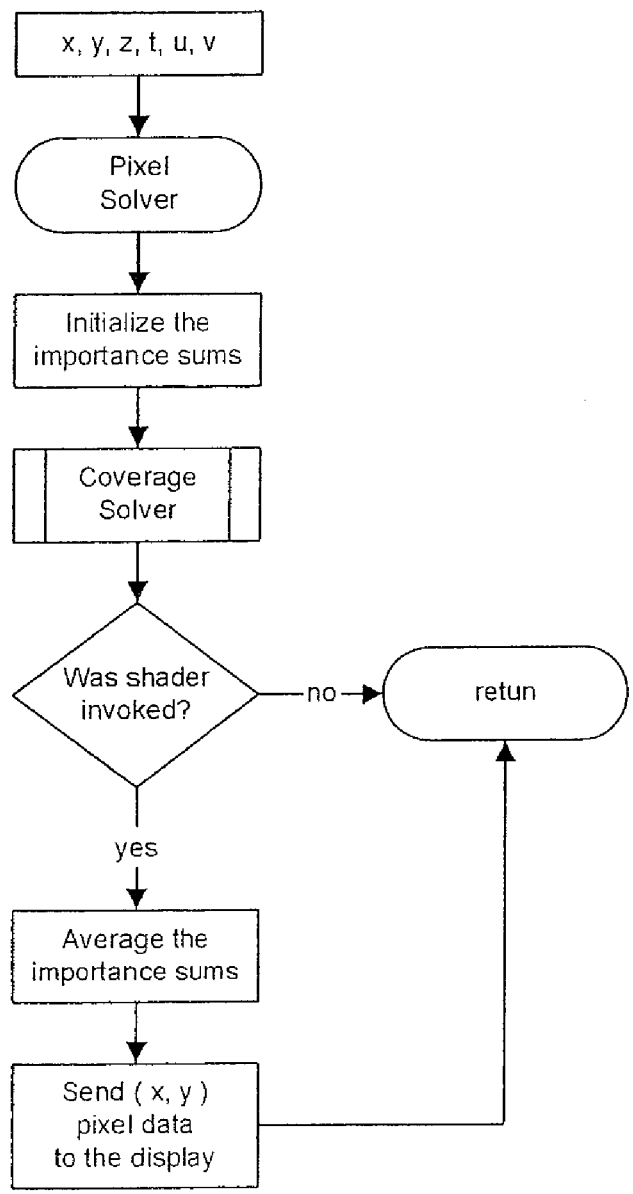

The pixel solver, depicted in FIG. 15, is essentially a liaison between SCREEN and the other solvers, acting as a synchronization point and performing a housekeeping function. Preliminarily, PIXEL seeks an answer to the question, is the nature of the x-y interval corresponding to a pixel area, and thereby the t, u, and v solutions associated therewith, such that the shader has been invoked (i.e., color and opacity, for example, has been assigned or designated). If the shader has been invoked, by calling upon the coverage solver, no further parsing of the x-y space (e.g., FIGS. 19(b)-19(f)) is required, and the x-y pixel data is sent to the display.

Figure 16:
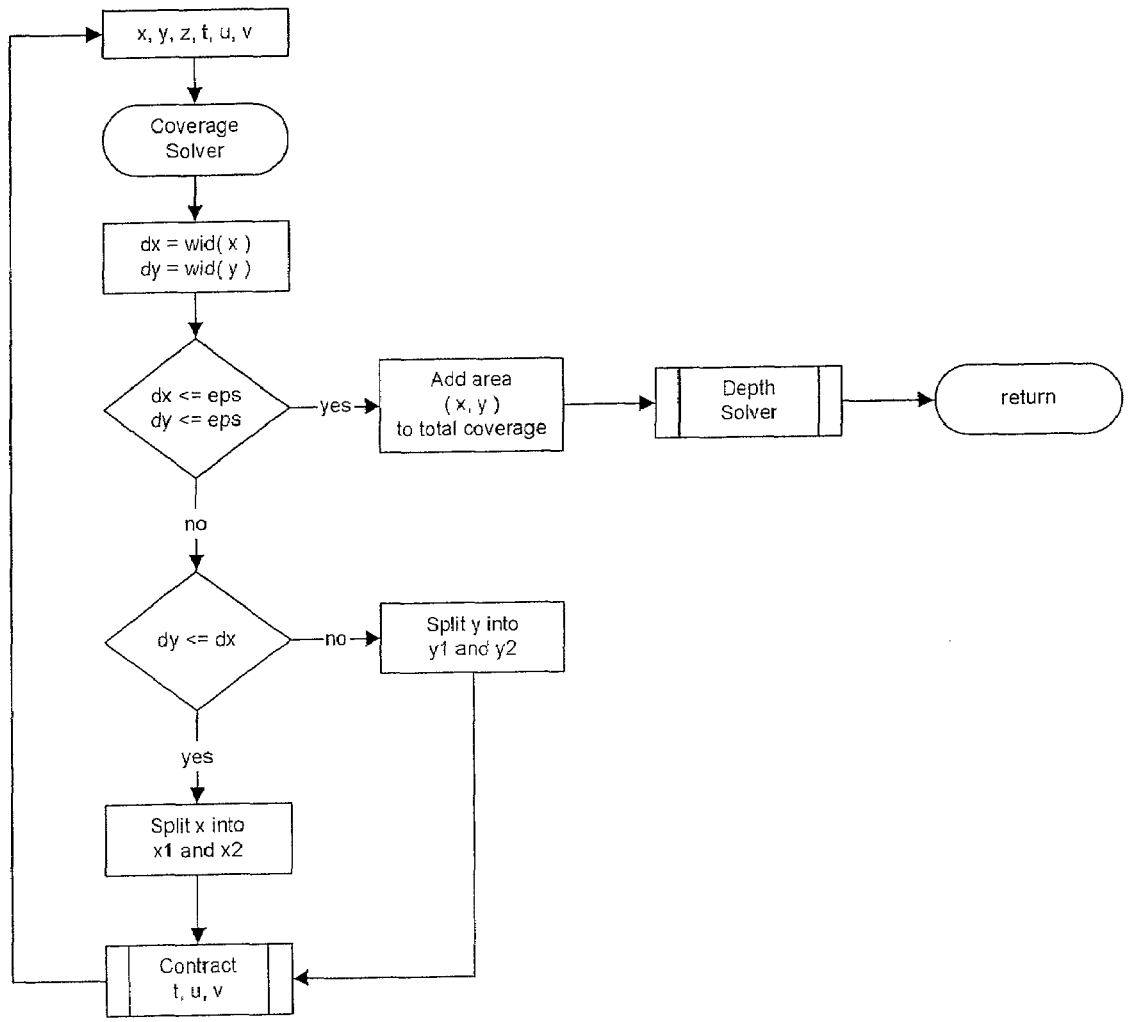

The coverage solver, as detailed in FIG. 16, essentially replicates the iterations of SCREEN, based upon a user defined limit epsilon (eps). COVERAGE, as the name suggests, seeks to delimit, via the retention of contributing t, u, v aspects based upon the user specified chop area "eps," those portions (i.e., areas) of the object surface within the pixel subunit (again, see FIGS. 19(b)-19(f)). Upon ascertaining the values associated with the x-y space, or area, they are added or compiled to provide or define the total coverage of the object surface (i.e., a mapping of the entire x-y space). At this point, analysis, more particularly processing in x-y space is complete. The next procedural task is a consideration of depth (i.e., assessment of Z(t, u, v) of the parametric system with a fixed or set x and y).

Figure 17:
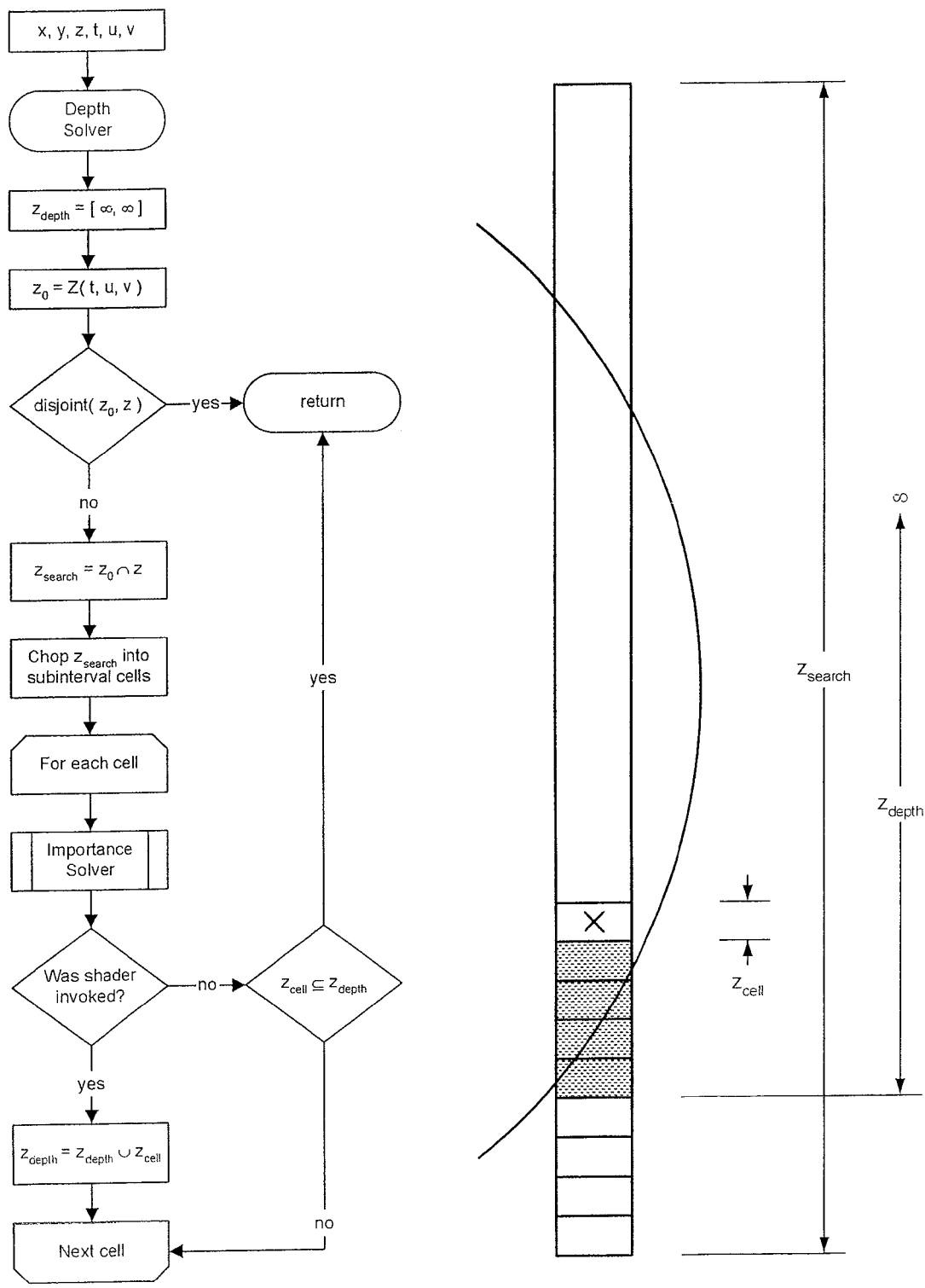

The depth solver, as detailed in FIG. 17, is essentially doing the job of FIG. 17(a). More particularly, DEPTH initially ascertains where in the z dimension, ultimately from the image plane (see FIG. 4 camera space), does the object surface, heretofore defined in x, y, t, u, v aspects, first appear or reside (i.e., in which depth cell), and thereafter step into space, via iterative cells, until the x, y, t, u, v object surface is no longer present in a cell (i.e., cell X of FIG. 17(a)). In furtherance thereof, the depth variable, more accurately, depth function, is initialized for all depth space, namely set to the infinite interval z depth, i.e., set to an interval at an infinite distance from the viewer. Thereafter, t, u, v, contraction begins in the depth field (z0). Subsequently, there is a trivial accept/reject query as to whether there is in fact a depth component of the x-y parameterization, with searching commencing thereafter (z search). For each depth cell, the importance solver (i.e., the t, u, v, chopper wherein a set inversion is executed in t, u, v so as to contract same) is called upon, and it is necessary to next assess if the shader was invoked. If the shader is invoked (i.e., a first visible root is identified), the outputs of the shader are accumulated into the importance sums and the depth parsing continues in furtherance of accounting for all z components of the x-y object surface, if not, steps, on a cell by cell basis, are "walked off." Although the parsing or chopping of z space has been described as a serial or loop type progression, it is certainly amenable to recursive splitting, as the case of the x-y space.

Figure 18:
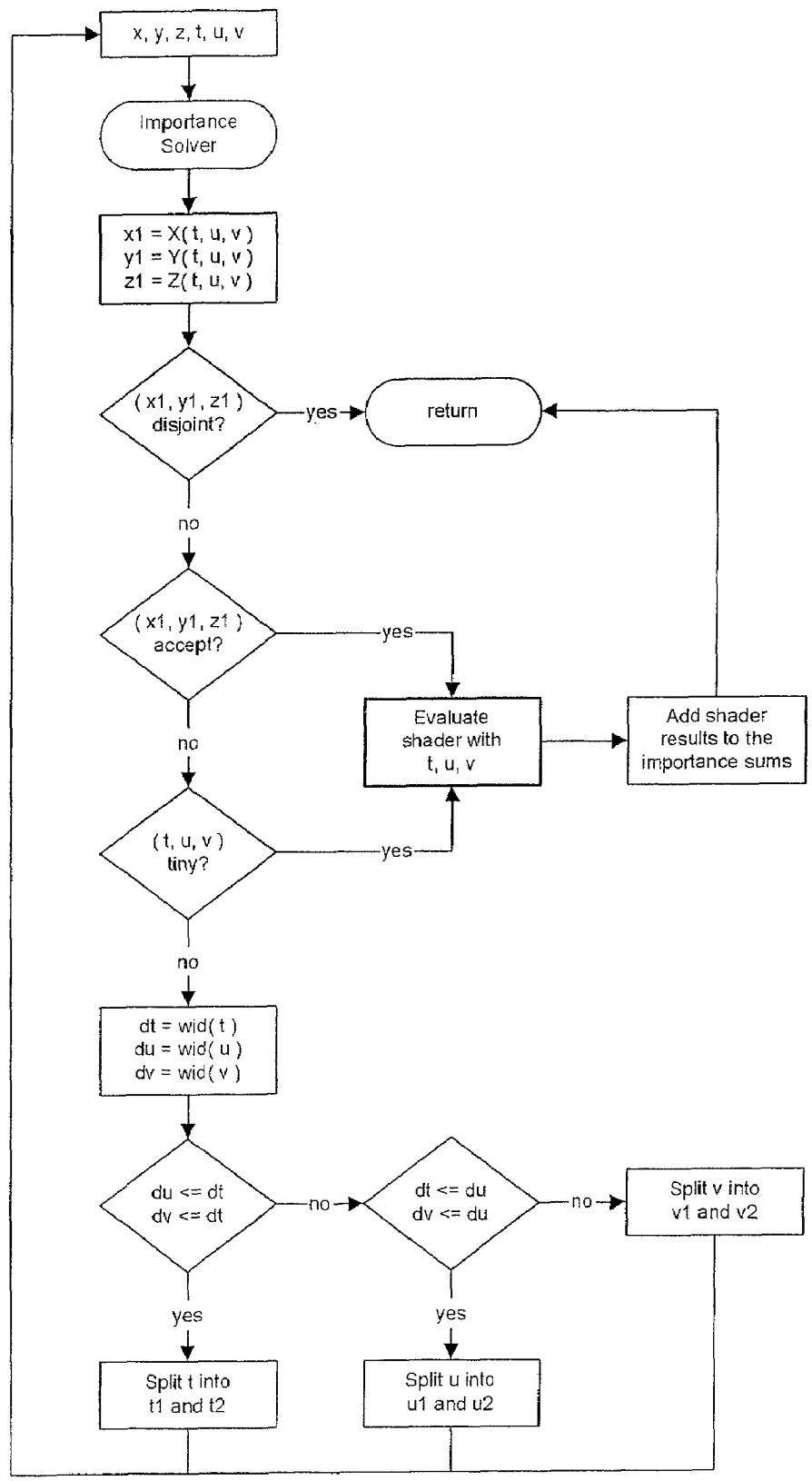

The importance solver, as detailed in FIG. 18, when called, essentially completes a set inversion in t, u, v, that is to say, for the smallest x, y, z (i.e., each specific z cell for, or in, which an object surface element x-y resides), t, u, v are to be narrowed as much or as finely as possible. The function of the importance solver is to fit or optimally match the t, u, v with the x, y, z, in a way that is overreaching, not underreaching. In furtherance thereof, importance filtering is conducted.

As should be readily appreciated, the same methodology may be used in a shading routine to integrate radiance over the solid angle of a hemisphere. The only change needed to accomplish this is to define a function:

$$\phi(t, u, v)$$

$$\theta(t, u, v)$$

$$\rho(t, u, v)$$

where $\phi$, $\theta$, and $\rho$ represent the parametric domain of the hemisphere as previously outlined, for integration, the t, u, and v representing geometric primitives in the digital scene. If the shading routine performs this procedure recursively, very accurate bounds on the radiance function for a pixel can be computed.

It should be noted, and/or again emphasized, that to the extent that the subject description has only used a 3-dimensional parameter domain as an example, the method described herein works for any n-dimensional parameter domain. For example, additional parameters such as temperature, mass or pressure can be used to specify the manifold that appears in the x, y and z domain of the image. This allows more complex and accurate simulations to be represented in the digital scene and applied to the rendered image.

There are other variations of this invention which will become obvious to those skilled in the art. It will be understood that this disclosure, in many respects, is only illustrative. Although the various aspects of the present invention have been described with respect to various preferred embodiments thereof, it will be understood that the invention is entitled to protection within the full scope of the appended claims.

The invention claimed is:

1. A computer executable area subdivision methodology for visible surface determination of elements of an image frame of a digital scene wherein the elements are represented by geometric interval functions stored within virtual memory, the steps comprising: (a) executing, by means of interval arithmetic, a robust and non-heuristic area analysis of a screen or pixel coordinate system of the image frame in furtherance of ascertaining at least a portion of a visible solution set of an element of the elements of the image frame; and, (b) computing said at least a portion of the visible solution set of the element of the elements of the image frame.

2. The computer executable area subdivision methodology of claim 1 wherein the geometric interval functions representing the elements of the image frame of the digital scene are nonlinear.

3. The computer executable area subdivision methodology of claim 1 wherein the geometric interval functions representing the elements of the image frame of the digital scene are implicit.

4. The computer executable area subdivision methodology of claim 1 wherein the geometric interval functions representing the elements of the image frame of the digital scene are parametric.

5. A computer executable area subdivision methodology for visible surface determination of elements of an image frame of a digital scene wherein the elements are represented by geometric interval functions stored within virtual memory, the methodology characterized by a use of interval arithmetic to perform a robust and non-heuristic area analysis of a screen or pixel coordinate system of the image frame, the steps comprising: (a) performing an interval bisection of a set of interval variables which associate a geometric interval function of the geometric interval functions to the screen or pixel coordinate system of the image frame, said interval bisection yielding a first and second set of interval variables; (b) inputting said first and second set of interval variables into the geometric interval function; (c) computing, for said first and second set of interval variables, a first and second error-bounded result; (d) using said first and second error-bounded result to ascertain, for said image frame, at least a portion of a visible solution set of an element of the elements of the image frame; and, (e) computing said at least a portion of the visible solution set of the element of the elements of the image frame.

6. The computer executable area subdivision methodology of claim 5 wherein said geometric interval function is nonlinear.

7. The computer executable area subdivision methodology of claim 5 wherein said geometric interval function is implicit.

8. The computer executable area subdivision methodology of claim 5 wherein said geometric interval function is parametric.

9. A computer executable area subdivision methodology for visible surface determination of elements of an image frame of a digital scene wherein the elements are represented by at least a parametric function stored within virtual memory, the methodology characterized by a use of interval arithmetic to perform a robust and non-heuristic area analysis of a screen or pixel coordinate system of the image frame, the steps comprising:
(a) performing an interval bisection of a set of parametric variables which associate a parametric function to the screen or pixel coordinate system of the image frame, said interval bisection yielding a first and second set of parametric variables; (b) inputting said first and second set of parametric variables into the parametric function; (c) computing, for said first and second set of parametric variables, a first and second error-bounded projection of the parametric function into the screen or pixel coordinate system of the image frame; (d) using said first and second error-bounded projection to ascertain, for said image frame, at least a portion of a visible solution set of an element of the elements of the image frame; and, (e) computing said at least a portion of the visible solution set of the element of the elements of the image frame.

10. The computer executable area subdivision methodology of claim 9 wherein said parametric function is nonlinear.

11. A system using interval arithmetic for robust and non-heuristic visible surface determination of portions of an image frame of a digital scene in furtherance of photorealistic rendering in a computer graphics environment, said system comprising: (a) a scene database wherein visual characteristics of the image frame of the digital scene are delimited as geometric interval functions; and, (b) at least one interval solver operatively linked to a system input characterized by said geometric interval functions, said at least one interval solver being configured so as to simultaneously subdivide (i) an area of a screen or pixel coordinate system of the image frame and (ii) a set of interval variables which associate a geometric interval function of said geometric interval functions to said screen or pixel coordinate system of the image frame.

12. The system of claim 11 wherein said geometric interval functions are parametric.

13. The system of claim 11 wherein said geometric interval functions are implicit.

14. The system of claim 11 wherein said geometric interval functions are nonlinear.

15. In a photorealistic image synthesis method wherein digital representations of geometric interval functions are selectively input, and one or more user-defined shading routines are selectively called upon in the course of assessment of the geometric interval functions in furtherance of the production of a rectangular output array of pixels representing at least a portion of the visible set of surfaces of the geometric interval functions, the steps comprising: (a) executing a robust and non-heuristic interval branch-and-bound method to compute shading values for pixels, to a user specified certainty, of the rectangular output array of pixels representing at least a portion of the visible set of surfaces of the geometric interval functions by successively splitting interval variables of a set of interval variables which associate a geometric interval function of the geometric interval functions to a screen or pixel coordinate system of the rectangular output array of pixels; and, (b) computing said shading values for said pixels.

16. The photorealistic image synthesis method of claim 15 wherein said geometric interval function is nonlinear.

17. The photorealistic image synthesis method of claim 15 wherein said geometric interval function is implicit.

18. The photorealistic image synthesis method of claim 15 wherein said geometric interval function is parametric.

19. A system for visible surface determination in furtherance of photorealistic rendering in a computer graphics environment, said system comprising: (a) a scene database wherein visual characteristics of elements of an image frame of said scene database are delimited as geometric interval functions; and, (b) a processor for executing a robust and non-heuristic interval analysis of an area not exceeding a pixel dimension for a pixel of an array of pixels that form the image frame, to a user degree of certainty, for ascertaining at least a portion of a visible solution set of an element of the elements of said area not exceeding a pixel dimension for a pixel of an array of pixels that form the image frame.

20. A photorealistic image synthesis system for constructing or reconstructing elements of an image of a digital scene wherein the elements are represented by geometric interval functions, said system comprising at least one interval solver for robust and non-heuristic computation of a visible solution set of an area of a pixel of the image frame, a geometric interval function of said geometric interval functions being associated with at least a portion of said area by a set of interval variables, and at least one user defined shading routine mutually dependent upon said at least one interval solver, wherein interval variables of said interval variables comprising at least a portion of said visible solution set are input to said user defined shading routine in furtherance of assigning a quality or character to said area of said pixel.

* * * * *